United States Patent [19]

Pedrazzi

[11] Patent Number: 4,594,410

[45] Date of Patent: Jun. 10, 1986

[54] AZO COMPOUNDS CONTAINING BOTH SULFO GROUPS AND BASIC OR CATIONIC GROUPS WHICH COMPOUNDS ARE IN METAL-FREE OR 1:1 METAL COMPLEX FORM

[75] Inventor: Reinhard Pedrazzi, Allschwil, Switzerland

[73] Assignee: Sandoz Ltd., Basel, Switzerland

[21] Appl. No.: 409,111

[22] Filed: Aug. 18, 1982

Related U.S. Application Data

[62] Division of Ser. No. 289,487, Aug. 3, 1981, abandoned.

[30] Foreign Application Priority Data

Aug. 9, 1980 [DE] Fed. Rep. of Germany ....... 3030197

[51] Int. Cl.$^4$ ............... C09B 45/18; C09B 45/28; C09B 31/047; C09B 31/12; C09B 31/26; C09B 31/30; D06P 1/10
[52] U.S. Cl. ............... 534/701; 534/831; 534/836; 534/837; 534/567; 534/569; 534/572; 534/602; 534/603; 534/604; 534/605; 534/614; 534/680; 534/693; 534/696; 534/697; 534/715; 534/716; 534/719; 534/721; 534/728; 534/796; 534/797; 534/803; 534/806; 534/808; 534/809; 534/810; 534/811; 534/813; 534/815; 534/829
[58] Field of Search ............... 260/153, 146 T; 534/603, 604, 605, 614, 708, 701, 614, 680, 693, 696, 697, 715, 716, 719, 721, 728, 796, 797, 803, 806, 811, 813, 815, 829

[56] References Cited

U.S. PATENT DOCUMENTS

| | | | |
|---|---|---|---|
| 3,185,676 | 5/1965 | Klein | 260/145 |
| 4,273,707 | 6/1981 | Pedrazzi | 260/153 |
| 4,363,761 | 12/1982 | Pedrazzi | 260/153 |
| 4,367,172 | 1/1983 | Pedrazzi | 260/153 |

FOREIGN PATENT DOCUMENTS

| | | | |
|---|---|---|---|
| 014677 | 8/1980 | European Pat. Off. | 260/158 |
| 2915323 | 11/1979 | Fed. Rep. of Germany | 260/153 |
| 1211425 | 3/1960 | France | 260/147 |
| 1370454 | 8/1964 | France | 260/153 |
| 2424305 | 11/1979 | France | 260/153 |
| 564582 | 7/1975 | Switzerland | 260/153 |
| 958899 | 5/1964 | United Kingdom | 260/156 |

OTHER PUBLICATIONS

Ullmanns Encyklopädie der Technischen Chemie, 4th ed., vol. 8, Verlag Chemie, Weinheim/Bergstr., pp. 282–283.

*Primary Examiner*—Floyd D. Higel
*Attorney, Agent, or Firm*—Gerald D. Sharkin; Richard E. Vila; Melvyn M. Kassenoff

[57] ABSTRACT

Azo dyes of the formula $$(HO_3S)_m-(F)\begin{matrix}(Z_1-X)_n\\ \\ [Z_2(X)_2]_p\end{matrix},$$

and external salts thereof, wherein

F is the residue of a monoazo or disazo compound in 1:1 metal complex form or of a trisazo, disazoazoxy or tetrakisazo compound in metal-free or 1:1 metal complex form, each X is independently $-NR_2-Q-NR_3R_4$ or $-NR_2-Q-N^{\oplus}R_5R_6R_7$, wherein Q is linear or branched $C_{2-6}$alkylene or $-NH-CO-CH_2-$, $R_2$ is hydrogen or $C_{1-4}$alkyl, each of $R_3$ and $R_4$ is independently hydrogen; $C_{1-6}$alkyl; $C_{2-6}$alkyl monosubstituted by cyano or hydroxy in the 2-, 3-, 4-, 5- or 6-position; phenyl($C_{1-3}$alkyl); phenyl($C_{1-3}$alkyl) having, on the phenyl ring, 1, 2 or 3 substituents selected from chloro, $C_{1-4}$alkyl and $C_{1-4}$alkoxy; $C_{5-6}$cycloalkyl or $C_{5-6}$cycloalkyl substituted by 1, 2 or 3 $C_{1-4}$alkyl groups or $-NR_3R_4$ is a saturated or unsaturated 5- or 6-membered heterocyclic ring containing, in addition to the nitrogen atom, no further or one further hetero atom, each of $R_5$ and $R_6$ is independently $C_{1-6}$alkyl; $C_{2-6}$alkyl monosubstituted by cyano or hydroxy in the 2-, 3-, 4-, 5- or 6-position; phenyl($C_{1-3}$alkyl); phenyl($C_{1-3}$alkyl) having, on the phenyl ring, 1, 2 or 3 substituents selected from chloro, $C_{1-4}$alkyl and $C_{1-4}$alkoxy; $C_{5-6}$cycloalkyl or $C_{5-6}$cycloalkyl substituted by 1, 2 or 3 $C_{1-4}$alkyl groups, and $R_7$ is $C_{1-4}$alkyl or benzyl or $$-\overset{|}{N}R_5R_6$$

is a saturated or unsaturated 5- or 6-membered heterocyclic ring containing, in addition to the nitrogen atom, no further or one further hetero atom or $-N^{\oplus}R_5R_6R_7$ is pyridinium or pyridinium substituted by 1 or 2 methyl groups, each $Z_1$ is independently $-CO-$, $-SO_2-$ or

[structure: triazine ring with $-NR_1$ substituent and Y substituent, with N atoms at positions shown]

wherein $R_1$ is hydrogen or $C_{1-4}$alkyl, and

Y is chloro, hydroxy, amino, an aliphatic, cycloaliphatic or aromatic amino group or a saturated heterocyclic amino group in which the nitrogen atom is part of the heterocyclic ring, each $Z_2$ is independently (Abstract continued on next page.)

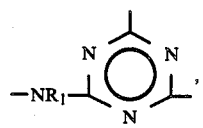
wherein
R₁ is hydrogen or $C_{1-4}$alkyl,
m is 1, 2 or 3,
n is 0, 1, 2, 3 or 4, and
p is 0, 1, 2, 3 or 4,
with the proviso that $n+2p \geq m+1$, useful for dyeing and printing cotton, paper and leather.
23 Claims, No Drawings

AZO COMPOUNDS CONTAINING BOTH SULFO GROUPS AND BASIC OR CATIONIC GROUPS WHICH COMPOUNDS ARE IN METAL-FREE OR 1:1 METAL COMPLEX FORM

This application is a division of application Ser. No. 06/289,487, filed Aug. 3, 1981 and now abandoned.

The present invention relates to basic or cationic, sulphonic acid group-containing azo compounds.

More particularly, the present invention provides compounds of formula I,

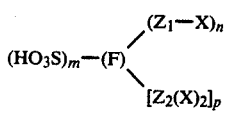

in which

F is the residue of a monoazo or disazo compound in 1:1 metal complex form or of a trisazo, disazoazoxy or tetrakisazo compound in metal-free or in 1:1 metal complex form, m is 1, 2 or 3,
n is 0, 1, 2, 3 or 4,
p is 0, 1, 2, 3 or 4,
each $Z_1$, independently, is —CO—, —$SO_2$— or

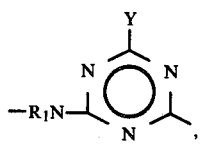 (A)

each $Z_2$, independently, is

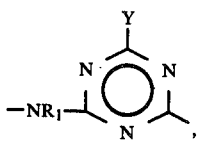 (B)

each $R_1$, independently, is hydrogen or $C_{1-4}$alkyl,
each Y, independently, is Cl, —OH, —$NH_2$, an aliphatic, cycloaliphatic or aromatic amine radical or a heterocyclic saturated amine in which the nitrogen atom is part of the heterocycle,
each X, independently, is —$NR_2$—Q—$NR_3R_4$ or —$NR_2$—Q—$N^{\oplus}R_5R_6R_7$,
each Q, independently, is linear or branched chain $C_{2-6}$alkylene or —$NHCOCH_2$—,
each $R_2$, independently, is hydrogen or $C_{1-4}$-alkyl,
each $R_3$ and $R_4$, independently, is hydrogen; $C_{1-6}$-alkyl; cyano- or hydroxy-$C_{2-6}$-alkyl in which the substituent is in other than 1-position; phenyl-$C_{1-3}$-alkyl in which the phenyl nucleus is optionally substituted by a total of up to 3 substituents selected from chlorine, $C_{1-4}$alkyl and $C_{1-4}$-alkoxy; $C_{5-6}$cycloalkyl optionally substituted by up to three $C_{1-4}$alkyl groups or
$R_3$ and $R_4$ together with the nitrogen atom to which they are bound form a 5- or 6-membered saturated or unsaturated heterocyclic ring which optionally contains a further heteroatom,
either, each $R_5$ and $R_6$, independently, has one of the significances given above for $R_3$ and $R_4$ with the exception of hydrogen, and
each $R_7$, independently, is $C_{1-4}$alkyl or benzyl, or $R_5$, $R_6$ and $R_7$, together with the nitrogen atom to which they are bound form a pyridinium cation, which is optionally substituted by 1 or 2 methyl groups,
with the proviso that $n + 2p \geq m + 1$, or an external salt thereof.

In the compounds of formula I the sulpho groups may react with the X groups to form internal salts of the type $(XH)^{\oplus}SO_3^{\ominus}$ or $X^{\oplus}SO_3^{\ominus}$. The compounds of formula I have more basic and/or cationic groups than sulphonic acid groups, and the additional basic and/or cationic groups may form external salts to render the compounds water-soluble.

The diazo components of the compounds of the invention may be of the aromatic carbocyclic or heterocyclic series, such as of the aniline, aminonaphthalene, aminodibenzofuran or benzothiazole series. Preferred diazo components are those of the aniline series.

The coupling components may be any of those standard for azo dyestuffs. Preferably the end coupling component is one of the naphthalene series which optionally contains 1 or 2 sulpho groups; more preferably such end coupling components are 1-naphthol-3- or -4-sulphonic acid, 5-, 6-, 7- or 8-amino-1-naphthol-3-sulphonic acid or 8-amino-1-naphthol-3,6-disulphonic acid and especially 6-amino-1-naphthol-3-sulphonic acid and derivatives thereof.

It will be appreciated that the diazo and coupling components optionally bear metallizable groups such as —OH, —$OCH_3$, —$NH_2$, —COOH, etc. ortho to the azo group. Preferred metallizable groups are —OH and —$OCH_3$.

The polyazo chromophores of the compounds of the invention may be those in which the coupling components or diazo components of two monoazo and/or disazo compounds are directly bound to each other or are bound via a bridge member. In such compounds the components which are directly linked or linked through a bridge member are preferably of the phenylene, naphthylene or tetrahydronaphthylene series, most preferably of the 1,4-phenylene series.

Representative metal complexes are copper, nickel and iron, with 1:1 copper complexes being most preferred especially when the copper is bound to an oxygen atom.

The sulpho groups may be on any of the components or even bridge members, preferably 1 or 2 sulpho groups are located on coupling components.

The groups —$Z_1$—X and —$Z_2(X)_2$ may be bound to the diazo components and/or middle components when present, and/or end coupling components. The group —$Z_1'$—X, hereinafter referred to as $X_I$ where —$Z_1'$, is —CO— or —$SO_2$—, is preferably located on a diazo component. For diazo components of the aniline series the following positions may be given:

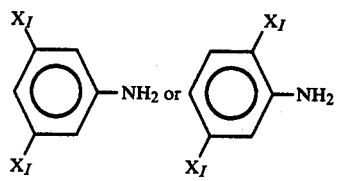

(a₁)    (a₂)

wherein when two groups $X_I$ are present they are preferably the same and the diazo component bears no further substituent, and where a diazo component of the aniline series bears a single group $X_I$ such is preferably located meta or para to the amino group.

The groups $—Z_1''—X$ or $—Z_2—(X)_2$ hereinafter referred to as $X_{II}$ where $—Z_1''$ is a group of formula (A) may be located on diazo components, middle components and/or end coupling components with compounds in which an end coupling component bears such a group being especially preferred. For diazo components of the aniline series the following position may be given $$\underset{(a_3)}{\begin{array}{c}X_{II}\\ \langle O \rangle —NH_2\end{array}} \quad \text{or} \quad \underset{(a_4)}{X_{II}—\langle O \rangle —NH_2}$$

In ($a_3$) when a further substituent is present it is preferably located and in the 2-, 4- or 6-position and when 2 further substituents are present they are preferably located in the 2,5-positions. In ($a_4$) preferably only 1 further substituent is present which is located in the 2- or 3-position.

If the end coupling component bears a group $X_{II}$ it is preferably of the formula $$(b_1)$$

in which either the sulpho group is in the 3-position and $X_{II}$ is in the 5-, 6-, 7- or 8-position or the sulpho group in the 5-position and $X_{II}$ in the 8-position. More preferably such end component is of the formula $$(b_2)$$

If the groups $X_I$ or $X_{II}$ are on middle components such middle component is preferably of the aniline series, preferably such group of the aniline series bears $X_{II}$ in a position meta to the amino group or may bear a group $—NHCO(CH_2)_{1-3}N(C_{1-4}alkyl)_2$ or $—NHCO(CH_2)_{1-3}N^\oplus(C_{1-4}\text{-alkyl})_3A^\ominus$, where $A^\oplus$ is an anion.

Any alkylene as Q is linear or branched, preferably any alkylene as Q is straight chain and most preferably is ethylene or propylene.

Any alkyl as $R_1$ and/or $R_2$ is preferably methyl.

Preferably $R_1$ and $R_2$ are $R_1'$ and $R_2'$ where each of $R_1'$ and $R_2'$, independently, is hydrogen or methyl, with hydrogen being most preferred.

Preferably $R_3$ and $R_4$ are identical. Any $C_{1-6}$-alkyl group is straight chain or branched. Any alkyl is preferably $C_{1-4}$alkyl, with methyl and ethyl being most preferred. Any cyano or hydroxy substituted alkyl is preferably cyano- or hydroxy- ethyl or -propyl.

Any phenylalkyl as $R_3$ and/or $R_4$ is preferably benzyl in which the phenyl nucleus is preferably unsubstituted.

Any cycloalkyl is preferably cyclohexyl and any alkyl substitutent on cycloalkyl is preferably methyl.

When $R_3$ and $R_4$ together with the nitrogen atom form a heterocyclic ring they preferably form a pyrrolidine, piperidine or morpholine ring.

$R_3$ and $R_4$ are preferably $R_3'$ and $R_4'$, where each of $R_3'$ and $R_4'$, independently, is hydrogen, linear or branched $C_{1-6}$alkyl, 2-hydroxyethyl, linear 2- or 3-hydroxypropyl, benzyl or together with the N-atom they form a pyrrolidine, piperidine or morpholine ring. More preferably each of $R_3$ and $R_4$ is $R_3''$ and $R_4''$, where each of $R_3''$ and $R_4''$, independently, is hydrogen, linear or branched $C_{1-4}$alkyl, 2-hydroxyethyl or together with the N-atom they form a piperidine or morpholine ring; most preferably $R_3$ and $R_4$ are $R_3'''$ and $R_4'''$, where each of $R_3'''$ and $R_4'''$, independently, is methyl or ethyl.

The groups $R_5$ and $R_6$ are preferably the same. The preferred significances for $R_3$ and $R_4$ also apply to $R_5$ and $R_6$ with the exception that $R_5$ and $R_6$ are other than hydrogen.

Any alkyl as $R_7$ is preferably methyl or ethyl, especially methyl.

Preferably, either $R_5$ and $R_6$, independently, have one of the preferred significances of $R_3$ and $R_4$ i.e. $R_3'$, $R_4'$, $R_3''$, $R_4''$ or $R_3'''$ and $R_4'''$ and $R_7$ is $R_7'$, where $R_7'$ is methyl, ethyl or benzyl, more preferably methyl; or $R_5$, $R_6$ and $R_7$ together with the N-atom signify a pyridinium cation.

Belonging to the cation, $—NR_2—Q—N^\oplus R_5R_6R_7$ is either a $SO_3^\ominus$ already present in the molecule or any nonchromophoric anion $A^\ominus$ which may be organic or inorganic. The nature of the anion $A^\ominus$ is not critical. Examples of representative anions $A^\ominus$ are chloride, bromide, iodide, lactate, acetate, formate, citrate, methylsulphate, ethylsulphate and hydrogensulphate.

Preferred basic groups as X are $—NR_2'—Q—NR_3'R_4'$     $X_a$, more preferably $—NR_2'—Q'—NR_3''R_4''$     $X_b$ where Q' is linear or branched $C_{2-6}$alkylene, even more preferably $—NR_2'—(CH_2)_{2-6}—NR_3''R_4''$     $X_c$, and most preferably $—NR_2'—(CH_2)_{2-3}—NR_3'''R_4'''$     $X_d$ especially when $R_2'$ is hydrogen and more especially $—NH(CH_2)_3NR_3'''R_4'''$.

For the cationic group $—NR_2—Q—N^\oplus R_5R_6R_7$ the groups $X_a'$ to $X_d'$ are preferred i.e.

$—NR_2'—Q—N^\oplus R_5'R_6'R_7'$     $X_a'$ where $R_5'$ and $R_6'$ have one of the significances of $R_3'$ and $R_4'$, respectively, $—NR_2'—Q'—N^\oplus R_5''R_6''R_7'$,     $X_b'$ where Q' is as defined above, and $R_5''$ and $R_6''$ have one of the significances of $R_3''$ and $R_4''$, respectively, and $$-NR_2'-(CH_2)_{2\text{-}6}-N^{\oplus}R_5''R_6''R_7' \qquad X_c'$$

$$-NR_2'-(CH_2)_{2\text{-}3}-N^{\oplus}R_5'''R_6'''R_7' \qquad X_d'$$

in which $R_5'''$ and $R_6'''$ have one of the significances of $R_3'''$ and $R_4'''$, respectively.

More preferably the cationic group is $X_e$ where $X_e$ is

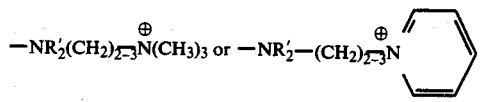

When Y is an aliphatic amino group it is preferably a monoalkyl- or dialkylamino group in which the alkyl group contains 1 to 4 carbon atoms and is straight chain or branched and is optionally substituted by halogen (preferably chlorine or bromine), phenyl or preferably hydroxy.

Any cycloaliphatic amine radical as Y is preferably a $C_{5\text{-}6}$cycloalkylamino group.

Any aromatic amine radical as Y is preferably an aniline radical in which the phenyl ring is optionally substituted by 1 or 2 substituents selected from the group consisting of halogen (preferably chlorine), $C_{1\text{-}4}$alkyl, $C_{1\text{-}4}$alkoxy, hydroxy and phenoxy.

Any heterocyclic amine radical as Y is preferably morpholine which is bound through the N-atom.

Each Y, independently, is preferably $Y_a$, where $Y_a$ is Cl, OH, $-NH_2$, mono-$C_{1\text{-}4}$alkylamino, 2-, 3- or 4-hydroxy-$C_{2\text{-}4}$alkylamino, di-$C_{1\text{-}2}$alkylamino, bis[2-, 3- or 4-hydroxy-$C_{2\text{-}4}$alkyl]amino, anilino or morpholino; more preferably each Y, independently, is $Y_b$, where $Y_b$ is Cl, OH, $-NH_2$, mono-$C_{1\text{-}2}$alkylamino, 2-, 3- or 4-hydroxy-$C_{2\text{-}4}$-alkylamino or bis[2-, 3- or 4-hydroxy-$C_{2\text{-}4}$alkyl]amino.

Each $X_I$, independently, is preferably $X_{Ia}$, where $X_{Ia}$ is $-CO-X_a$, $-CO-X_a'$, $-SO_2-X_a$ or $-SO_2-X_a'$, more preferably $X_{Ib}$ as $-CO-X_b$, $-CO-X_b'$, $-SO_2-X_b$ or $-SO_2-X_b'$, even more preferably $X_{Ic}$ as $-CO-X_c$ or $-CO-X_c'$ and especially $X_{Id}$ as $-CO-X_d$ or $-CO-X_d'$ in which $R_2'$ is preferably hydrogen and $-CO-X_d'$ is preferably $X_{Ie}'$ where $X_{Ie}$ is $-CO-X_e$. The basic significances of $X_{Ia}$, i.e., $-CO-X_a$ and $-SO_2-X_a$, are hereafter referred to as $X_{Ia}'$, the basic significances of $X_{Ib}$, i.e, $-CO-X_b$ and $-SO_2-X_b$, are hereafter referred to as $X_{Ib}'$, and the basic significances of $X_{Ic}$ and $X_{Id}$, i.e., $-CO-X_c$ and $-CO-X_d$, respectively, are hereafter referred to as $X_{Ic}'$ and $X_{Id}'$, respectively.

Each $X_{II}$, independently, is preferably $X_{IIa}$ or $X_{IIa}'$, where $X_{IIa}$ is

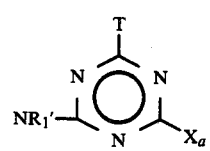

where T is $X_a$ or $Y_a$, preferably $Y_a$ is $Y_b$ and $X_{IIa}'$ is

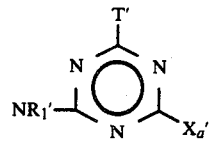

where T' is $X_a'$ or $Y_a$, preferably $Y_a$ is $Y_b$; more preferably $X_{IIb}$ or $X_{IIb}'$, where $X_{IIb}$ is

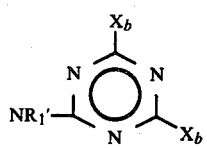

and $X_{IIb}'$ is

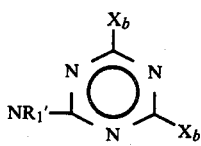

even more preferably $X_{IIc}$ or $X_{IIc}'$ where $X_{IIc}$ is

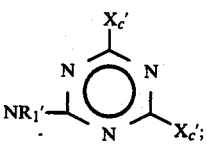

and $X_{IIc}'$ is

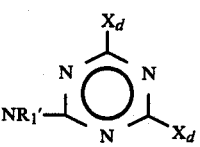

and most preferably $X_{IId}$ or $X_{IId}'$ in which $R_1'$ and $R_2'$ are preferably hydrogen, where $X_{IId}$ is

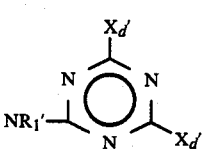

and $X_{IId}'$ is

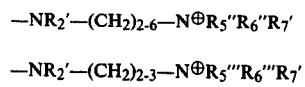

especially where $X_d'$ is $X_e$ to give $X_{IIe}$

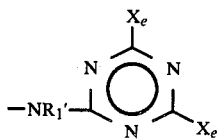

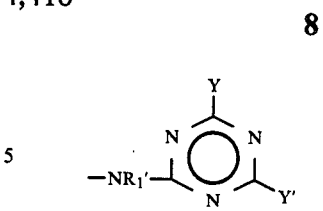

By halogen as used hereinbefore and after is meant fluorine, chlorine or bromine.

The preferred halogen is chlorine.

Preferred complexes are of formula I' in which $R_1'$ and Y are as defined above, and

Y' has one of the significances of Y with the exception of chlorine.

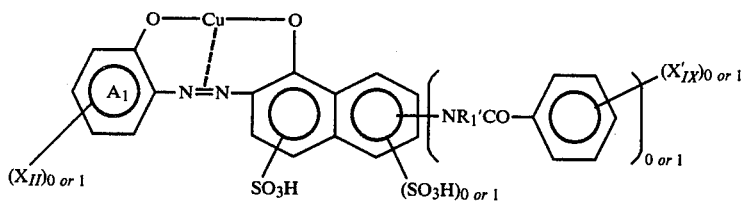

in which each of $X_{II}$ and $X_{II}'$, independently, is

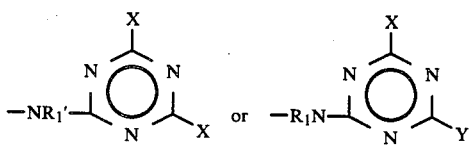

and the ring $A_1$ optionally bears 1 or 2 further substituents selected from halogen, $C_{1-4}$alkyl, $C_{1-4}$alkoxy, phenoxy, —NHCOR$_{13}$, —SO$_2$R$_{13}$, —SO$_2$NR$_1$R$_1$ and —CONR$_1$R$_1$, where R$_{13}$ is $C_{1-4}$alkyl or phenyl.

Also preferred are complexes of formula II,

Further preferred complexes are of formula II$_a$

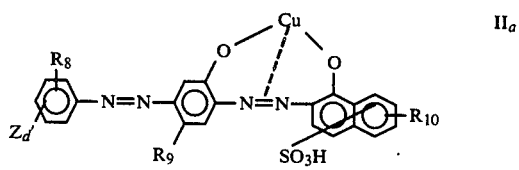

in which $Z_d'$ is a group $X_{IIb}$ or $X_{IIe}$, or two groups $X_{Ia}'$ or $X_{Ie}$ which may be the same or different, and $R_8$ is hydrogen, $C_{1-4}$alkyl, $C_{1-4}$alkoxy, halogen,

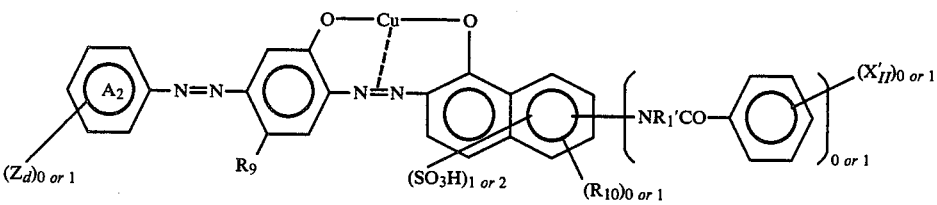

in which $Z_d$ is $X_{II}$ or signifies 1 or 2 groups $X_I$ and ring $A_2$ is optionally substituted by up to 2 further substituents selected from halogen, $C_{1-4}$alkyl, $C_{1-4}$alkoxy, phenoxy, —NHCOR$_{13}$, —SO$_2$R$_{13}$, —SO$_2$NR$_1$R$_1$ and —CONR$_1$R$_1$, where R$_{13}$ is $C_{1-4}$alkyl or phenyl, R$_9$ is either hydrogen, halogen, $C_{1-4}$alkyl, $C_{1-4}$alkoxy, —NHCO($C_{1-4}$alkyl), —NHCONH$_2$, —NHCO(CH$_2$)$_{1-3}$N($C_{1-4}$alkyl)$_2$ or —NHCO—(CH$_2$)$_{1-3}$—N$^\oplus$(CH$_3$)$_3$A$^\ominus$, where A$^\ominus$ is an anion, or R$_9$ together with the two carbon atoms on the benzene ring forms a condensed benzene ring, R$_{10}$ is hydrogen; —OH; —NH$_2$; ($C_{1-4}$alkyl)carbonylamino; benzoylamino or anilino in which the phenyl nucleus is optionally substituted by one or two substituents selected from halogen, —NO$_2$, —NH$_2$, $C_{1-4}$alkyl and $C_{1-4}$alkoxy; or is —SO$_2$NR$_1$R$_1$ or —CONR$_1$R$_1$.

Preferably R$_8$ is R$_8'$, where R$_8'$ is hydrogen, chlorine, methyl, methoxy, —SO$_2$NH$_2$ or —CONH$_2$. More preferably R$_8$ is R$_8''$, where R$_8''$ is hydrogen, chlorine, methyl or methoxy, most preferably hydrogen.

R$_9$ is preferably R$_9'$, where R$_9'$ is hydrogen, chlorine, methyl, methoxy, acetylamino, —NHCONH$_2$, —NHCO(CH$_2$)$_{2-3}$N(CH$_3$)$_2$ or —NHCO(CH$_2$)$_{2-3}$—N$^\oplus$(CH$_3$)$_3$A$^\ominus$; more preferably R$_9$ is R$_9''$, where R$_9''$ is hydrogen, methyl or methoxy.

R$_{10}$ is preferably R$_{10}'$, where R$_{10}'$ is hydrogen, —NH$_2$, acetylamino, benzoylamino or anilino.

Preferred compounds of formula II$_a$ are (1) those where $Z_d'$ is $X_{IIc}$ or signifies two identical groups $X_{Ic}'$;

(2) those where R$_8$ is R$_8'$, especially R$_8''$;

(3) those of (1) and/or (2) where R$_9$ is R$_9'$, especially R$_9''$;

(4) those of (1) to (3) where R$_{10}$ is R$_{10}'$;

(5) those of (1) to (4) where R$_8$ is hydrogen;

(6) those of (1) to (5) where $Z_d'$ is $X_{IId}$ or signifies 2 identical $X_{Id}'$ groups.

Further preferred complexes are of formula II$_b$

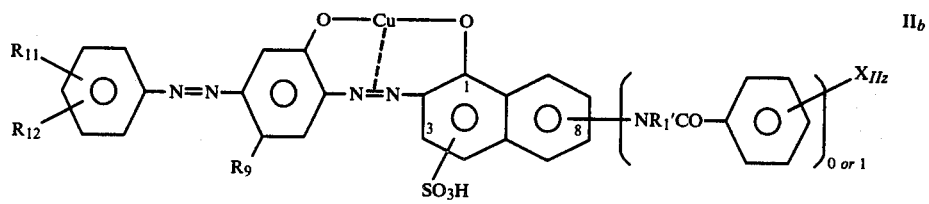

IIb in which $X_{IIz}$ is a group $X_{IIb}$ or $X_{IIe}$, $R_{11}$ is hydrogen, halogen, $C_{1-4}$alkyl, $C_{1-4}$alkoxy, phenoxy, —NHCOR$_{13}$, —SO$_2$R$_{13}$, —SO$_2$NR$_1$R$_1$ or —CONR$_1$R$_1$, and $R_{12}$ is hydrogen, halogen, $C_{1-4}$alkyl or $C_{1-4}$alkoxy.

Preferably $R_{11}$ is $R_{11}'$, where $R_{11}'$ is hydrogen, chlorine, methyl, methoxy, acetylamino, benzoylamino, —SO$_2$NH$_2$ or —CONH$_2$; more preferably $R_{11}$ is $R_{11}''$, where $R_{11}''$ is hydrogen, chlorine, methyl, methoxy, acetylamino or benzoylamino, most preferably hydrogen.

$R_{12}$ is preferably $R_{12}'$, where $R_{12}'$ is hydrogen, chlorine, methyl or methoxy, especially hydrogen.

Preferred compounds of formula II$_b$ are (1) those where $R_{11}$ is $R_{11}'$ and $R_{12}$ is $R_{12}'$;

(2) those where $R_9$ is $R_9'$, especially $R_9''$;

(3) those of (1) and/or (2) where $X_{IIz}$ is $X_{IIc}$, especially $X_{IId}$;

(4) those of (1) to (3) where $R_{11}$ is $R_{11}''$ and $R_{12}$ is hydrogen;

(5) those of (4) where the sulpho group is in the 3-position and $X_{IIz}$ as $X_{IIc}$ or $X_{IId}$ is in the 6-position;

(6) those of (5) where $R_{11}$ is hydrogen.

Further preferred complexes are of formula II$_c$,

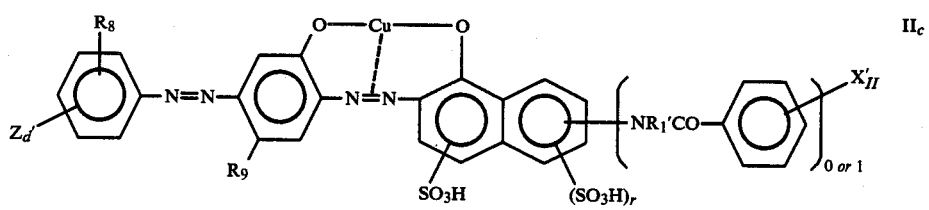

II$_c$ in which r is 0 or 1.

Preferred compounds of formula II$_c$ are (1) those where $R_8$ is $R_8'$, especially $R_8''$;

(2) those where $R_9$ is $R_9'$, especially $R_9''$;

(3) those of (1) and/or (2) where $Z_d'$ is $X_{IIc}$ or 2 identical groups $X_{Ic}'$;

(4) those of (1) to (3) where $X_{II}'$ is $X_{IIb}$ or $X_{IIe}$, especially $X_{IIc}$;

(5) those of (3) and/or (4) where $R_8$ is hydrogen;

(6) those of (1) to (5) where $Z_d'$ is $X_{IId}$ or is two identical groups $X_{Id}'$ and $X_{II}'$ is $X_{IId}$.

Also preferred complexes are those of formulae III$_a$ and III$_b$

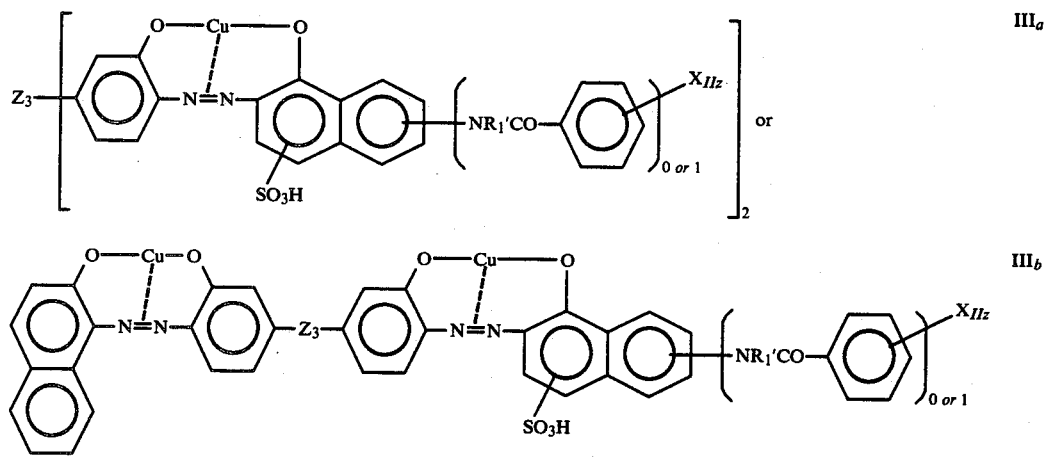

III$_a$

III$_b$ in which each $X_{IIz}$'s in the compound of formula III$_a$ may be the same or different and are preferably the same, $Z_3$ is a direct bond, —(CH$_2$)$_{1-3}$—, —CH=CH—,

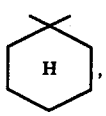,

—O—, —NH—, —S—, —SO$_2$—, —NHCO—, —O(CH$_2$)$_{2-3}$O—, —NHCONH—, —NHCO(CH$_2$)$_{2-3}$—CONH— or —CONH(CH$_2$)$_{2-3}$NHCO—.

$Z_3$ is preferably $Z_3'$, where $Z_3'$ is a direct bond, —(CH$_2$)$_2$—, —NHCO—, —NHCONH— or —NHCO(CH$_2$)$_2$CONH—.

Further preferred compounds of formulae III$_a$ and III$_b$ are
(1) those wherein X$_{IIz}$ is X$_{IIc}$;
(2) those wherein Z$_3$ is Z$_3'$; and
(3) those of (1) or (2) wherein X$_{IIz}$ is X$_{IId}$.

Further preferred complexes are of formula IV,

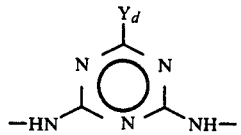

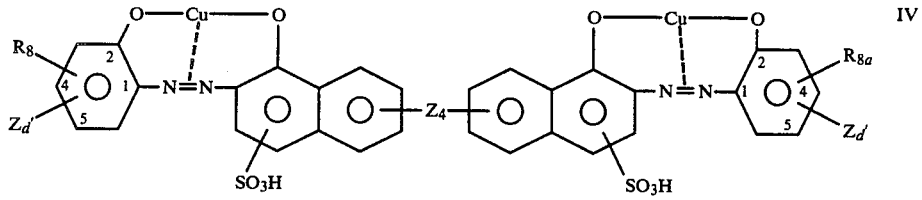

in which the groups
Z$_d'$ may be the same or different,
R$_{8a}$ has one of the significances of R$_8$, and
Z$_4$ is a divalent nitrogen-containing bridge member.

In the compounds of formula IV preferably each Z$_d'$ is the same and R$_8$ is the same as R$_{8a}$. Any X$_{IIb}$ or X$_{IIe}$ as Z$_d'$ is preferably in the 4- or 5-position of the benzene ring.

Preferred bridge members Z$_4$ are those Z$_{4a}$, where Z$_{4a}$ is —NH—, —NHCONH—,

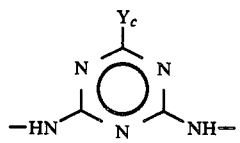

where the —CONH-group is in the 3- or 4-position, —NHCOCH$_2$CH$_2$CONH— or —NHCOCH=CH-CONH—, where Y$_o$ has one of the significances of Y or X.

More preferably Z$_4$ is Z$_{4b}$, where Z$_{4b}$ is —NH—, —NHCONH—, —NHCOCH$_2$CH$_2$CONH—, —NH-COCH=CHCONH— or

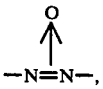

in which Y$_c$ has one of the significances of Y$_a$ or is X$_b$ or X$_e$.

Even more preferably Z$_4$ is Z$_{4c}$, where Z$_{4c}$ is —NH—, —NHCONH—, —NHCOCH=CHCONH— or wherein Y$_d$ has one of the significances of Y$_b$ or is X$_d$ or X$_e$.

Most preferably Z$_4$ is Z$_{4d}$, where Z$_{4d}$ is —NH— or —NHCONH—.

Preferred compounds of formula IV are
(1) those where R$_8$ and R$_{8a}$ and R$_8''$, especially hydrogen;
(2) those of (1) where X$_{IIb}$ is X$_{IIc}$ and X$_{Ia}'$ is X$_{Ib}'$, especially X$_{Ic}'$, preferably both are the same;
(3) those of (2) where X$_{IIb}$ is X$_{IId}$ and X$_{Ia}'$ is X$_{Id}'$;
(4) those of (1) to (3) where Z$_4$ is Z$_{4a}$, preferably Z$_{4b}$, especially Z$_{4d}$.

Also preferred compounds are those of formula V,

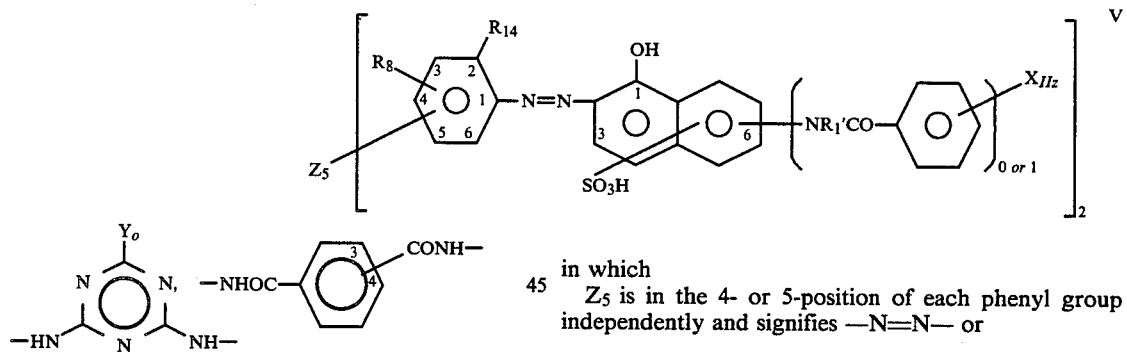

in which
Z$_5$ is in the 4- or 5-position of each phenyl group independently and signifies —N=N— or $$-\overset{O}{\overset{\uparrow}{N}}=N-,$$

each R$_{14}$, independently, is hydrogen or methoxy,
each R$_8$, independently, is hydrogen, C$_{1-4}$alkyl, C$_{1-4}$alkoxy, halogen, —SO$_2$NR$_1$R$_1$ or —CONR$_1$R$_1$; and
each X$_{IIz}$, independently, is X$_{IIb}$ or X$_{IIe}$,
and copper complexes thereof.

Preferred compounds and complexes of formula V are
(1) those where R$_8$ is R$_8''$;
(2) those where X$_{IIz}$ is X$_{IIc}$;
(3) those where X$_{IIz}$ is X$_{IId}$;
(4) those of (1) to (3) wherein the sulpho group is in the 3-position and X$_{IIz}$ as X$_{IIc}$ or X$_{IId}$ is directly bound to the naphthalene ring in the 6-position;
(5) those of (2) to (4) where R$_8$ is hydrogen.

Also preferred are compounds of formula VIa and complexes of formula VI$_b$,

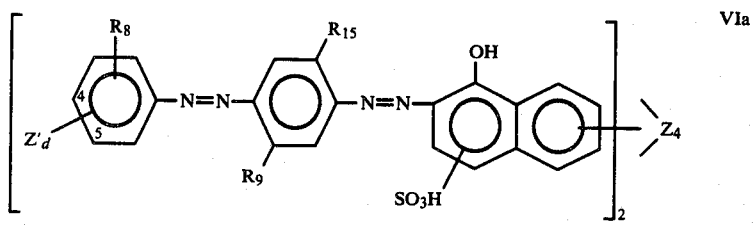

VIa

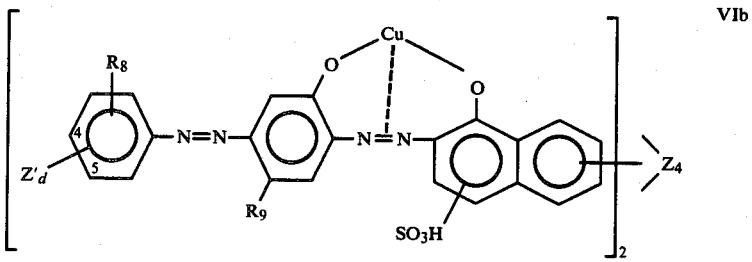

VIb in which $R_{15}$ is hydrogen, $C_{1-4}$alkyl or $C_{1-4}$alkoxy.

In the compounds and complexes of formulae $VI_a$ and $VI_b$ preferably the variables in both halves of the molecule are identical. $X_{IIb}$ or $X_{IIe}$ as $Z_d'$ are preferably in the 4- or 5-position. In the compounds of formula $VI_a$ preferably $R_{15}$ is hydrogen, methyl or methoxy.

Preferred compounds and complexes of formulae $VI_a$ and $VI_b$ are (1) those where $R_8$ is $R_8''$ and $R_9$ is $R_9''$;

(2) those where $Z_d'$ is $X_{IIc}$ or two identical groups $X_{Ic}'$;

(3) those of (1) where $Z_d'$ is $X_{IId}$ or two identical groups $X_{Id}'$;

(4) those of (1) to (3) where $Z_4$ is $Z_{4a}$, preferably $Z_{4b}$, especially $Z_{4d}$;

(5) those of (4) where $R_8$ is hydrogen.

Also preferred compounds are those of formula VII, $R_{16}$ is —OH or —NH$_2$, and
$R_{17}$ is —OH, —NH$_2$ or

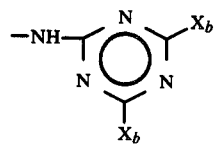

and copper complexes thereof.

Preferred compounds of formula VII and complexes thereof are (1) those where $R_8$ is $R_8''$, especially hydrogen;

(2) those where $X_{IIb}$ or $X_{IIe}$ as $Z_d'$ is in the 4- or 5-position;

(3) $M_1$ is a group (C) wherein $R_{15}$ is hydrogen, methyl or methoxy and $R_9$ is $R_9''$.

Also preferred are compounds of formula VIII,

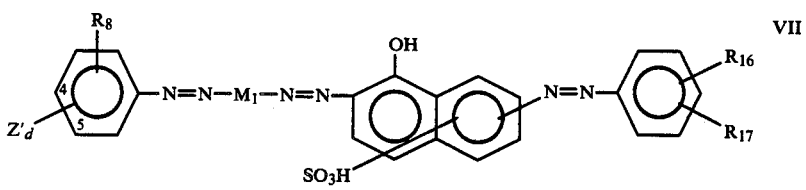

VII in which $M_1$ is

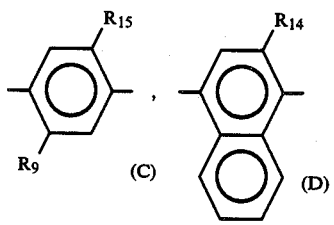

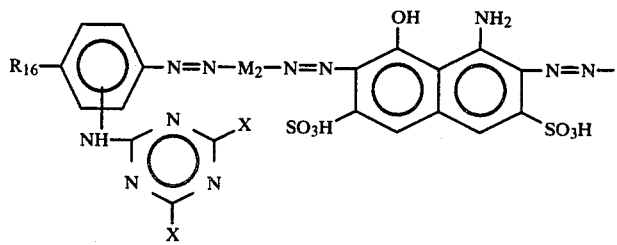
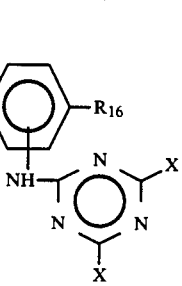

in which each $R_{16}$, independently, is —OH or —NH$_2$ and each $M_2$, independently, is

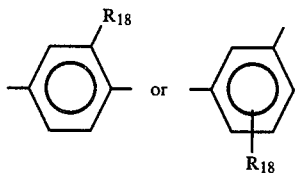

in which $R_{18}$ is hydrogen, chlorine, methyl or methoxy, and copper complexes thereof.

Preferred compounds of formula VIII and complexes thereof are (1) those where $R_{16}$ is —NH$_2$;
(2) those where X is $X_b$ or $X_e$, especially $X_d$.

The compounds of the invention are preferably in salt form.

The invention also provides a process for the production of complexes of formula I comprising reacting a compound of formula IX

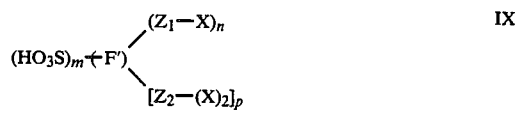

in which F' is a metallizable residue with an equivalent of a metal-donating compound.

Metallization is effected in accordance with known methods. Preferably coppering is effected by oxidative coppering at 40° to 70° C. in a medium having a pH of 4–7 in the presence of Cu(II) salts or copper powder with hydrogen peroxide or another conventional oxidation agent or more preferably by demethylation coppering, preferably in a medium having a pH in the range of 3–9 at temperatures up to the boil.

The compounds of formula IX may be prepared in accordance with known methods by diazotizing and coupling the corresponding starting materials. The disazoazoxy compounds may be obtained by reductive coupling of two nitro groups.

For example disazoazoxy compounds of formula V may be formed from the corresponding nitroanilines by coupling followed by connecting the two monoazo parts with a azoxy bridge by reducing the nitro groups in accordance with known methods, suitably using a mild reducing agent such as glucose and an alkaline medium having a temperature of 20° to 70° C., preferably 40° to 70° C.

Trisazo and tetrakisazo compounds containing a bridge member may be made by diazotization and coupling with a compound containing such a bridge member or by reacting two azo compounds with a compound yielding a bridging member.

Trisazo compounds are suitably prepared by coupling on either side of a tetrazo component.

It will be also be appreciated that the polyazo complexes of the invention may also be made by taking a metallized starting material and effecting a subsequent diazotization and coupling step.

The monoazo and disazo compounds of formula IX are described in DOS No. 2,915,323.

The compounds and complexes are isolated in accordance with known methods and may be converted to water-soluble salts by reacting the basic compound with at least a stoichiometric amount of a mineral acid such as hydrochloric acid, sulphuric acid, nitric acid, phosphoric acid or preferably an organic acid such as formic acid, acetic acid, lactic acid, citric acid, glycolic acid and methanesulphonic acid.

Further compounds containing free basic groups may be converted to quaternized compounds by reacting with corresponding alkylating agents.

The compounds and complexes of the invention, in acid addition salt form or quaternary ammonium salt form, are dyestuffs and are useful for dyeing and printing fibres, filaments and textiles comprising or consisting of cellulose, e.g. cotton, or preferably for dyeing and printing of paper or leather, including low affinity vegetable-tanned leather, in accordance with known methods.

Cotton is preferably dyed by the exhaust method. Paper may be dyed in the stock and may be sized or unsized or paper sheet may be dip-dyed.

The dyeings obtained, especially the paper dyeings, have good fastnesses, especially light-fastness and wet-fastnesses, and the exhaust bath is essentially colourless.

The dyestuffs have good solubility especially in cold water and are substantially pH resistant. The dyestuffs have good substantivity and build-up practically quantitatively. The dyestuffs can be added to paper stock as a dry powder or granulate and can also be used in soft water without loss of yield.

The dyes may be used to dye fibers containing wood shavings. Paper dyed with the dyes of the invention can be bleached oxidatively or reductively which is important for the recycling of waste and old paper.

The compounds and complexes may be used in the form of dye preparations. Suitable liquid, preferably aqueous, preparations may be made in accordance with known methods by dissolving in solvents optionally with the addition of assistants; such methods are described in French Pat. No. 1,572,030.

An example of a suitable liquid preparation is:
100 parts dye,
1–100 parts, preferably 1–10 parts, inorganic salt,
1–100 parts organic acid such as formic, acetic, lactic and citric acid,
100–800 parts water, and 0-500 parts solvating agent (e.g. glycols such as diethylene glycol, triethylene glycol, hexylene glycol; glycol ethers such as Methyl Cellosolve ®, Methyl Corbitol ® and butylpolyglycol; urea; formamide and dimethylformamide).

The dyes may also be made up into granulates in accordance with known methods such as that described in French Pat. No. 1,581,900.

A suitable granulate preparation comprises
100 parts dye,
1-100 parts, preferably 1-10 parts, inorganic salt, and
0-800 parts standardizing agent (preferably non-ionic such as dextrin, sugar, grape sugar or urea).

The solid preparations may contain up to 10% residual moisture.

The following Examples further serve to illustrate the invention. In the Examples all parts are by weight unless otherwise stated.

EXAMPLE 1

39.1 Parts of the red dye of the formula

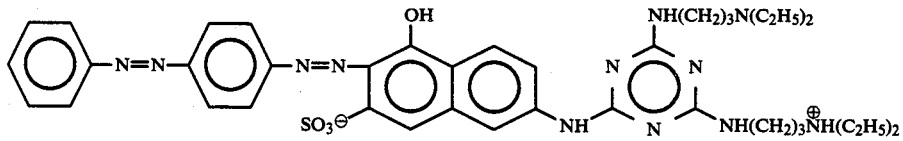

(made as described in Example 98 of DOS No. 2,915,323) are dissolved in 200 parts water and 50 parts acetic acid and heated to 40° C. Subsequently 15 parts $CuSO_4.5H_2O$ dissolved in 100 parts water are added and then 20 parts sodium acetate are sprinkled in. 250 Parts of 5% hydrogen peroxide solution are slowly added dropwise over 2 hours. Stirring is then effected for 8 hours at 40° C. after which oxidative coppering is complete. 30% sodium hydroxide is added till the pH is 9 to 10. The dye precipitates and is suction filtered and dried. A dye of formula

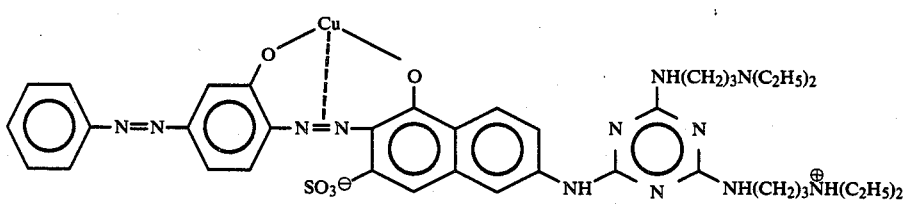

in powder form is obtained. The dye, in acid addition salt form, is well water-soluble and dyes paper in grey-violet shades. The dyeings obtained have good wet- and light-fastnesses. The waste water is colourless.

EXAMPLE 2

22.2 Parts of the red dye of the formula

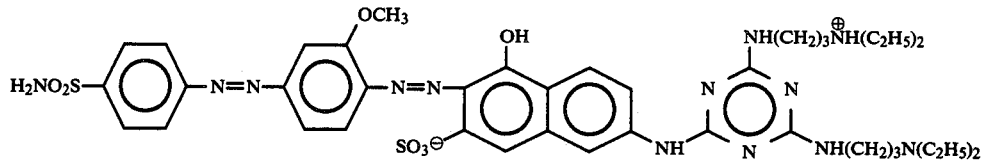

prepared in analogy to the procedure described in Example 98 of DOS No. 2,915,323 is suspended in 400 parts water and adjusted to pH 3.5 to 4 with sodium acetate. The whole is heated to 50° C. and a solution of 10 parts $CuSO_4.5H_2O$ in 100 parts water are added dropwise in 15 minutes. Then the temperature is raised to 95°–98° C. and stirring is effected for 28 hours after which the demethylation coppering is complete. In order to fully precipitate the dye 50 parts by vol. 30% sodium hydroxide are added at 20° C., the dye is suction filtered and then dried and corresponds to the formula

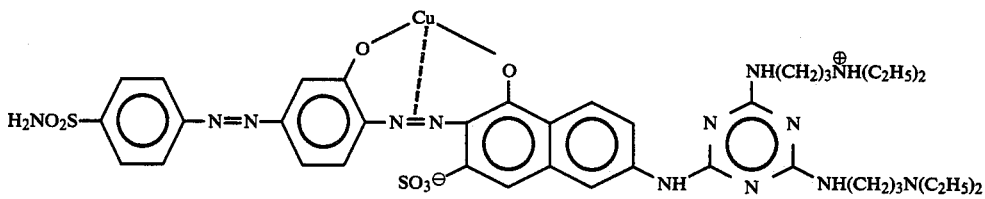

The dye, in the form of the acid addition salt, dyes paper in grey-blue shades; the dyeings have good wet- and light-fastnesses.

In analogy with the procedure of Examples 1 and 2 further dyestuffs given in Table 1 can be prepared. They correspond to the formula

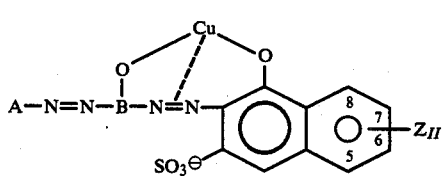

in which the symbols $Z_{II}$ have the following significances; the group

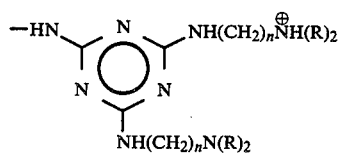

is $Z_{II}(1)$ to $Z_{II}(6)$ whereby when:

| | | | |
|---|---|---|---|
| $Z_{II}(1)$ | n = 3 | and | R = CH$_3$ |
| $Z_{II}(2)$ | n = 3 | and | R = C$_2$H$_5$ |
| $Z_{II}(3)$ | n = 2 | and | R = CH$_3$ |
| $Z_{II}(4)$ | n = 2 | and | R = C$_2$H$_5$ |
| $Z_{II}(5)$ | n = 2 | and | R = CH(CH$_3$)$_2$ |
| $Z_{II}(6)$ | n = 3 | and | R = CH$_2$CH$_2$OH; | the group

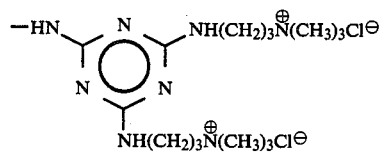

is $Z_{II}(7)$ and

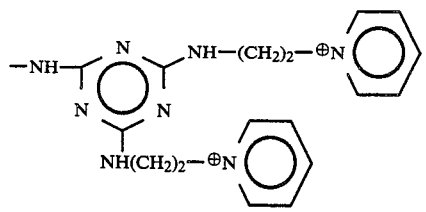

is $Z_{II}(8)$.

Component B is shown in unmetallized form. In the last column I the dye shade on paper is given whereby a=grey; b=grey-blue; c=brown-grey; d=blue; e=green-blue; f=steel-blue; g=reddish-blue; h=bordeaux; i=violet-blue; j=grey-violet; k=violet; l=red-brown and m=green. (This applies for all following Tables.)

TABLE 1

| Ex. No. | A | B (unmetallized) | $Z_{II}$ | position of $Z_{II}$ | I |
|---|---|---|---|---|---|
| 3 | | | $Z_{II}(1)$ | 7 | a |
| 4 | " | " | $Z_{II}(2)$ | 7 | a |
| 5 | " | " | $Z_{II}(2)$ | 6 | a |

TABLE 1-continued

| Ex. No. | A | B (unmetallized) | $Z_{II}$ | position of $Z_{II}$ | I |
|---|---|---|---|---|---|
| 6 | " | " | $Z_{II}(7)$ | 6 | a |
| 7 | " | " | $Z_{II}(3)$ | 6 | a |
| 8 | " | " | $Z_{II}(4)$ | 7 | a |
| 9 | " | " | $Z_{II}(2)$ | 8 | e |
| 10 | " | ―⟨C₆H₄⟩― | $Z_{II}(5)$ | 6 | a |
| 11 | ⟨C₆H₅⟩― | " | $Z_{II}(1)$ | 7 | a |
| 12 | " | " | $Z_{II}(2)$ | 7 | a |
| 13 | " | " | $Z_{II}(1)$ | 6 | j |
| 14 | " | 2,4-(OCH₃,CH₃)C₆H₃― | $Z_{II}(2)$ | 6 | d |
| 15 | " | " | $Z_{II}(1)$ | 6 | d |
| 16 | 3-SO₂NH₂-C₆H₄― | " | | 6 | d |
| 17 | " | 2-OCH₃-C₆H₄― | $Z_{II}(2)$ | 6 | b |
| 18 | " | " | $Z_{II}(1)$ | 6 | b |
| 19 | H₂NO₂S-C₆H₄― | " | $Z_{II}(7)$ | 6 | a |
| 20 | " | ―⟨C₆H₄⟩― | $Z_{II}(6)$ | 7 | a |
| 21 | " | " | $Z_{II}(2)$ | 5 | a |
| 22 | " | " | $Z_{II}(8)$ | 6 | a |
| 23 | 3-NHCOCH₃-C₆H₄― | 2-OCH₃-C₆H₄― | $Z_{II}(2)$ | 6 | b |

EXAMPLE 24

37.1 Parts of the red dye of the formula

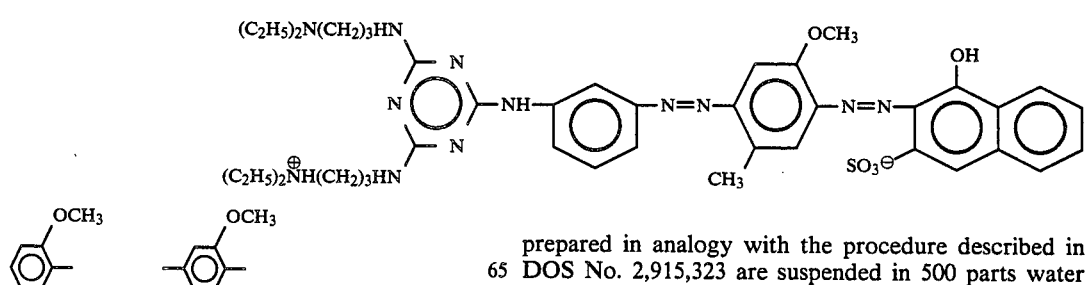

prepared in analogy with the procedure described in DOS No. 2,915,323 are suspended in 500 parts water and dissolved with the addition of 50 parts glacial acetic acid. The whole is heated to 90° C. and 40 parts sodium acetate are added thereto. Subsequently, the copper complex is formed employing 15 parts CuSO$_4$.5H$_2$O in 150 parts water in analogy with the procedure described in Example 2. The dye precipitates out in filterable form and is filtered and dried. The dye powder obtained corresponds to formula

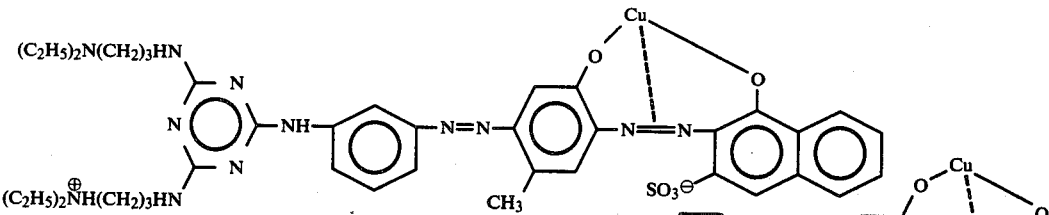

and in the acid addition salt form dyes paper in clear reddish-blue shades. The dyes have notable light- and wet-fastnesses.

In analogy with the procedure described in Example 24 further copper complexes given in Table 2 can be prepared. The dyes correspond to the formula in which $Z_{II}$ has the same significances as given above.

TABLE 2

| Ex. No. | $Z_{II}$ | position of $Z_{II}$ | $R_9$ | C | l |
|---|---|---|---|---|---|
| 25 | $Z_{II}(1)$ | 3 | CH$_3$ | (1-methyl-naphthalene-3-SO$_3^\ominus$) | g |
| 26 | $Z_{II}(2)$ | 3 | OCH$_3$ | " | f |
| 27 | $Z_{II}(7)$ | 3 | " | " | f |
| 28 | $Z_{II}(2)$ | 3 | H | " | d |
| 29 | $Z_{II}(1)$ | 3 | CH$_3$ | (1-methyl-naphthalene-4-SO$_3^\ominus$) | g |
| 30 | $Z_{II}(2)$ | 3 | " | " | g |
| 31 | $Z_{II}(4)$ | 3 | " | " | g |
| 32 | $Z_{II}(1)$ | 3 | OCH$_3$ | " | b |
| 33 | $Z_{II}(2)$ | 3 | " | " | b |
| 34 | $Z_{II}(2)$ | 3 | H | " | l |
| 35 | $Z_{II}(7)$ | 3 | H | " | l |
| 36 | $Z_{II}(1)$ | 4 | OCH$_3$ | " | m |
| 37 | $Z_{II}(2)$ | 4 | " | " | m |
| 38 | $Z_{II}(2)$ | 3 | " | (1-methyl-3-SO$_3^\ominus$-7-OH naphthalene) | e |
| 39 | " | 3 | CH$_3$ | " | k |
| 40 | $Z_{II}(1)$ | 3 | " | (1-methyl-naphthalene-5-SO$_3^\ominus$) | b |
| 41 | $Z_{II}(2)$ | 3 | " | " | b |
| 42 | " | 3 | OCH$_3$ | " | e |

TABLE 2-continued

| Ex. No. | $Z_{II}$ | position of $Z_{II}$ | $R_9$ | C | I |
|---|---|---|---|---|---|
| 43 | $Z_{II}(1)$ | 3 | $CH_3$ | 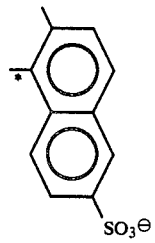 | c |
| 44 | " | 3 | " | " | c |
| 45 | " | 4 | —$NHCOCH_3$ | " | d |
| 46 | $Z_{II}(8)$ | 3 | H | " | c |
| 47 | $Z_{II}(2)$ | 3 | H | 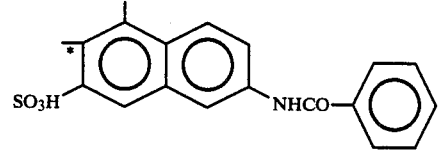 | d |
| 48 | " | 3 | $CH_3$ | " | d |

The asterisk denotes the C—atom bound to the azo group.

EXAMPLE 49

The dye of formula (A)

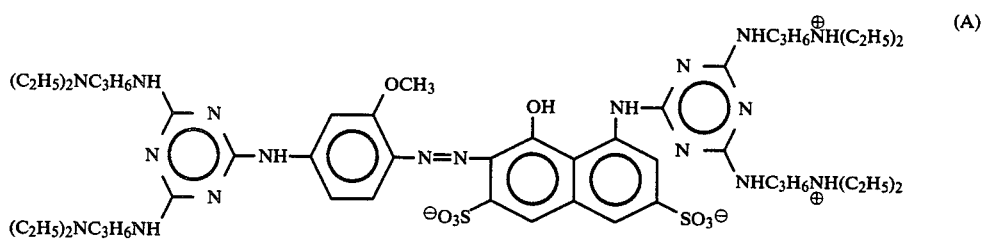

is demethylated and coppered in analogy with the procedure described in Example 2. The obtained dye of the formula

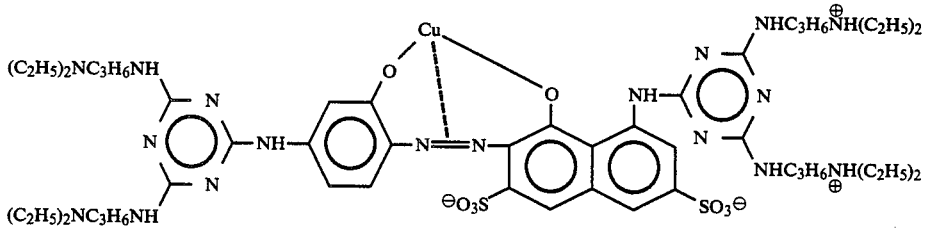

in acid addition salt form, dyes paper in clear blue shades. The dyes obtained have notable light- and wet-fastnesses.

The dye of formula (A) can be obtained as follows:
(a) 37.1 Parts of 2,4-bis-(3'-N,N-diethylaminopropylamino)-6-chloro-s-triazine are stirred in 200 parts water with sufficient hydrochloric acid to give a clear solution having a pH of 6 to 7. 31.9 Parts 1-amino-8-hydroxynaphthalene-3,6-disulfonic acid (H-acid) are added. The suspension is heated to 80° C. During this time 15 parts sodium acetate are added portionwise. After 3 hours a solution is obtained in which according to thin layer chromatography no further H-acid is detectable. Stirring is effected at room temperature whereby the reaction product crystallises out. The product is suction filtered and dried.

(b) 47.3 Parts 4-[2',4'-bis(3''-N,N-diethylaminopropylamino)-s-triazine-6'-ylamino]-2-methoxyaniline are acidified with hydrochloric acid in 250 parts water at 0° to 5° C. and are reacted with 25 parts of a 4N sodium nitrite solution. This diazo solution is dropped into a soda alkaline solution containing 80 parts of the product obtained under (a) such that the pH is maintained at 8 to 8.5. A blue dye solution is obtained which is stirred for a further 2 hours. Subsequently, the dye of formula (A) is precipitated with 400 parts 30% sodium hydroxide, filtered and dried.

EXAMPLES 50 AND 51

Using 3'-respectively 4'-aminobenzoyl-H-acid instead of H-acid and proceeding as described in Example 49, the corresponding copper complexes are obtained which, in acid addition salt form, dye paper in blue shades with good fastnesses, especially light-fastness.

EXAMPLE 52

Using the diazo component of the formula

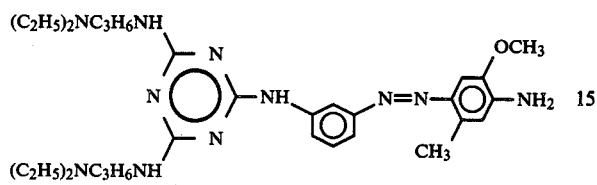

instead of that of Example 49 and proceeding as described in Example 2, the dye of the formula

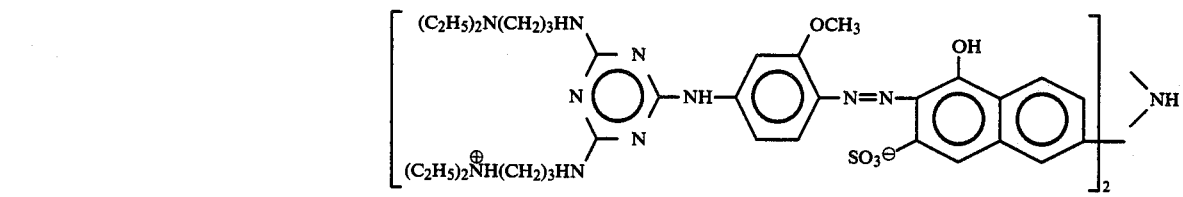

is obtained which, in acid addition salt form, dyes paper in green-blue shades. The paper dyeings have good wet-fastnesses and excellent light-fastness.

In analogy to the procedure of Example 52 further copper complexes given in Table 3 may be prepared. The dyes correspond to the formula and dye paper in the shade as given under I. The dyes show good wet- and light-fastnesses.

TABLE 3

| Ex. No. | $Z_{II}$ | d | position of $Z_{II}$ | $R_9$ | I |
|---|---|---|---|---|---|
| 53 | $Z_{II}(2)$ | 0 | 4; — | $CH_3$ | e |
| 54 | $Z_{II}(1)$ | 0 | 4; — | " | e |
| 55 | " | 1 | 4; 3' | " | e |
| 56 | $Z_{II}(2)$ | 1 | 4; 3' | " | e |
| 57 | $Z_{II}(1)$ | 1 | 3; 3' | $OCH_3$ | d |
| 58 | " | 1 | 3; 4' | " | f |
| 59 | $Z_{II}(2)$ | 1 | 3; 3' | " | d |
| 60 | " | 1 | 4; 3' | $CH_3$ | e |
| 61 | " | 1 | 4; 3' | H | d |
| 62 | " | 0 | 4; — | $OCH_3$ | e |
| 63 | $Z_{II}(1)$ | 0 | 3; — | " | e |
| 64 | $Z_{II}(2)$ | 0 | 3; — | " | e |
| 65 | $Z_{II}(1)$ | 0 | 3; — | H | d |
| 66 | $Z_{II}(7)$ | 0 | 3; — | $CH_3$ | e |
| 67 | $Z_{II}(8)$ | 0 | 4; — | $OCH_3$ | e |

EXAMPLE 68

7.7 Parts of the violet dye of the formula

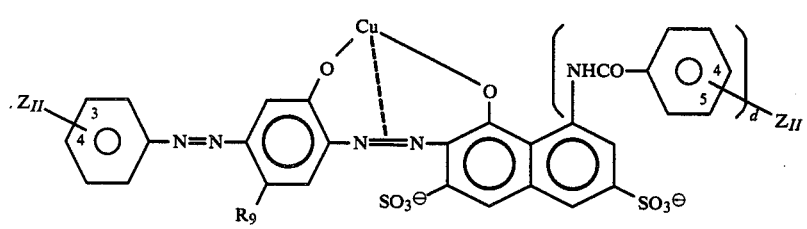

prepared in analogy with the procedure described in Example 55 of DOS No. 2,915,323 are stirred in 150 parts water and adjusted to pH 4 with glacial acetic acid. Then demethylation coppering is carried out in accordance with the procedure of Example 2. The dye of the formula

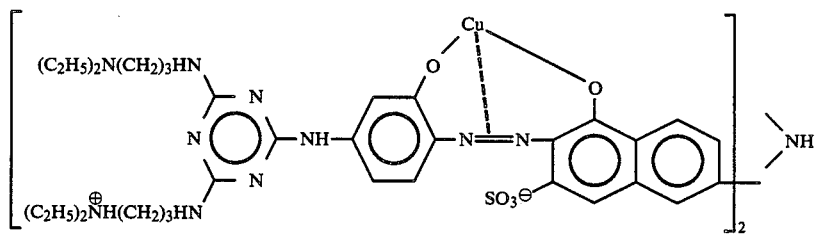

is obtained which, in acid addition salt form, dyes paper in reddish-blue shades with good fastnesses, especially wet-, alcohol- and light-fastness.

In analogy to the procedure of Example 68 further dyes in given Table 4 of the formula

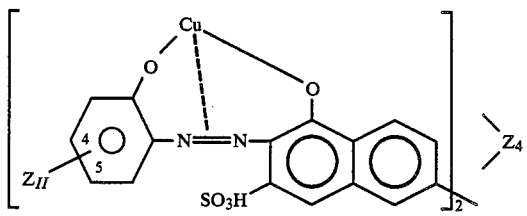

can be prepared.

TABLE 4

| Ex. No. | $Z_{II}$ | position of $Z_{II}$ | $Z_4$ | I |
|---|---|---|---|---|
| 69 | $Z_{II}(1)$ | 4 | —NH— | d |
| 70 | $Z_{II}(7)$ | 4 | " | d |
| 71 | $Z_{II}(1)$ | 5 | " | b |
| 72 | $Z_{II}(2)$ | 5 | " | b |
| 73 | $Z_{II}(1)$ | 4 | —NHCONH— | i |
| 74 | $Z_{II}(2)$ | 4 | " | i |
| 75 | $Z_{II}(4)$ | 4 | " | i |
| 76 | $Z_{II}(2)$ | 5 | " | j |
| 77 | $Z_{II}(8)$ | 4 | " | i |
| 78 | $Z_{II}(1)$ | 4 | ![structure] | i |
| 79 | $Z_{II}(2)$ | 5 | " | j |

EXAMPLE 80

150 Parts 2,4-bis-(3'-N,N-diethylaminopropylamino)-6-chloro-s-triazine are suspended in 500 parts water and adjusted to pH 6–7 with hydrochloric acid. 96 parts 2-amino-5-hydroxynaphthalene-7-sulfonic acid are added to the solution and the suspension is heated to 88° to 90° C. The pH is held at 2–2.2 by the addition of 60 parts crystalline sodium acetate. After 3 hours the condensation is complete. The coupling solution is cooled to room temperature.

48.8 Parts 4,4'-diamino-3,3'-dimethoxy-1,1'-diphenyl are stirred in 300 parts water, 200 parts ice and 120 parts 30% hydrochloric acid. Then a concentrated aqueous solution of 30 parts sodium nitrite is added dropwise and stirring is effected for 1 hour. A clear yellow tetrazo solution is obtained. The coupling solution is set with 200 parts ice and coupled with the above tetrazo solution at pH 8. After 4 to 6 hours coupling is complete. The pH is adjusted to 6–7 with 40 parts glacial acetic acid and then a solution of 110 parts $CuSO_4.5H_2O$, 300 parts water and 250 parts 25% ammonia is added and the temperature is raised to 95° to 97° C. After 5 hours coppering is complete. After cooling to room temperature the whole is made alkaline with 270 parts 30% sodium hydroxide and then filtered. The dye of the formula

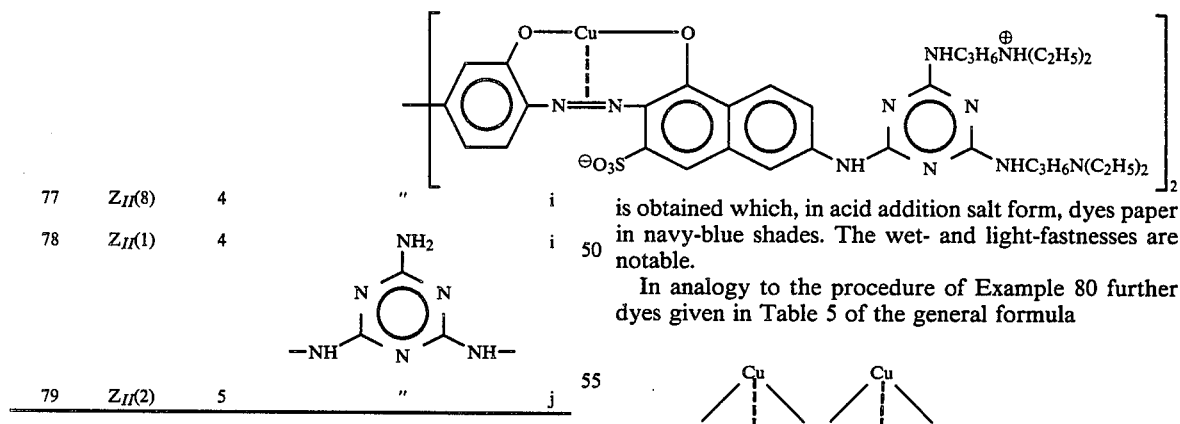

is obtained which, in acid addition salt form, dyes paper in navy-blue shades. The wet- and light-fastnesses are notable.

In analogy to the procedure of Example 80 further dyes given in Table 5 of the general formula

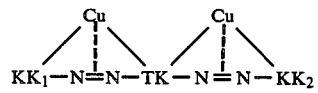

can be prepared.

TABLE 5

| Ex. No. | TK(unmetalized) | $KK_1$(unmetallized) | $KK_2$(unmetallized) | I |
|---|---|---|---|---|
| 81 | CH3O—⬡—⬡—OCH3 | OH, SO3⊖, $Z_{II}(2)$ | OH (naphthyl) | g |

TABLE 5-continued
| Ex. No. | TK(unmetalized) | KK₁(unmetallized) | KK₂(unmetallized) | I |
|---|---|---|---|---|
| 82 | " |  | " | g |
| 83 | " | " | =KK₁ | d |
| 84 | " |  | =KK₁ | e |
| 85 | " |  | =KK₁ | e |
| 86 | " |  | =KK₁ | g |
| 87 | " |  | =KK₁ | g |
| 88 | " |  | =KK₁ | b |
| 89 | " |  | =KK₁ | b |
| 90 | 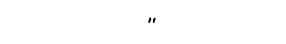 |  | =KK₁ | i |
| 91 | " |  | =KK₁ | i |
| 92 | " |  | =KK₁ | k |
| 93 | " |  | =KK₁ | k |
| 94 |  |  | =KK₁ | h |

TABLE 5-continued

| Ex. No. | TK(unmetalized) | KK₁(unmetallized) | KK₂(unmetallized) | I |
|---|---|---|---|---|
| 95 | " | OH, SO₃⁻, $Z_{II}(z)$ (naphthol-sulfonate) | =KK₁ | h |
| 96 | OCH₃–⟨⟩–CH₂CH₂–⟨⟩–OCH₃ | " | =KK₁ | d |
| 97 | OCH₃–⟨⟩–NHCO(CH₂)₂CONH–⟨⟩–OCH₃ | OH, SO₃⁻, $Z_{II}(1)$ (naphthol-sulfonate) | =KK₁ | i |

EXAMPLE 98

44.3 Parts 3-[2',4'-bis-(3''-N,N-diethylaminopropylamino)-s-triazine-6'-yl-amino]aniline are dissolved in 500 parts water with the addition of 50 parts 30% hydrochloric acid and diazotized at 0° to 5° C. with 27 parts 4N sodium nitrite solution. After 1 hour the excess nitrite is destroyed with amidosulphonic acid. 13.7 Parts 2-amino-1-methoxy-4-methylbenzyol are added and the pH fixed at 4 by adding sodium acetate. After 3 to 4 hours coupling is complete. The reaction mixture is acidified with hydrochloric acid and then 25 parts 4N sodium nitrite solution are added at room temperature. This diazo solution is added to a solution containing 23 parts 2,2'-dinaphthylamino-5,5'-dihydroxy-7,7'-disulphonic acid in such a way that the pH remains at 7.5–8. The blue dye suspension is stirred for 3 hours and then coupling is complete. The precipitated dye which is filtered and dried corresponds to the formula

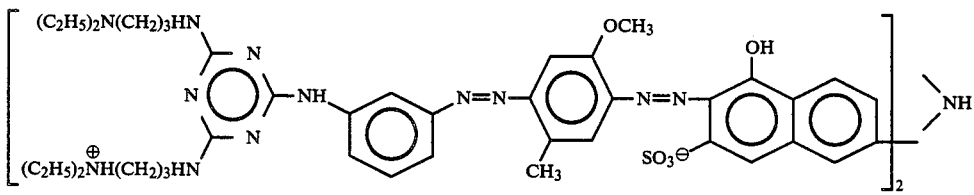

The dye, in acid addition salt form, dyes paper in navy-blue shades with good fastnesses.

EXAMPLES 99–113

In analogy to the procedure of Example 98 further unmetallized tetrakisazo dyes can be prepared employing instead of the diazo component having the group $Z_{II}(2)$ in position 3 a diazo component with $Z_{II}(2)$ in position 4 or one with the group $Z_{II}(1), Z_{II}(3)$ to $Z_{II}(8)$ in position 3 or 4. They all dye paper in navy-blue shades.

EXAMPLE 114

10 Parts of the dyestuff powder of Example 98 are stirred in 200 parts water and dissolved with the addition of 4 parts glacial acetic acid. Subsequently, demethylation and coppering is carried out according to the process of Example 2. The precipitated dye is filtered and dried at 60° C. in vacuo. The dye corresponding the formula

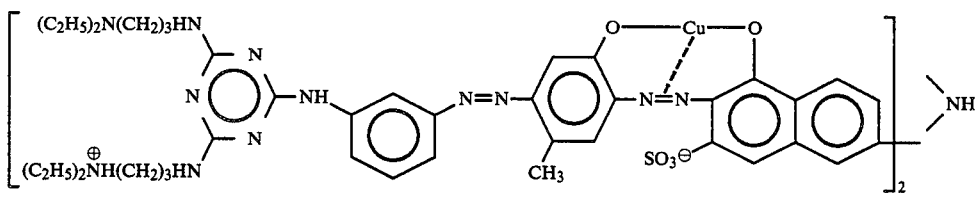

is obtained in form of a powder which in acid addition salt form, dyes paper in grey-blue shades with good light- and wet-fastnesses.

EXAMPLES 115–129

In analogy to Example 114 further copper complexes are obtained by employing instead of the diazo component having the group $Z_{II}(2)$ in position 3, a diazo component with $Z_{II}(2)$ in position 4 or with the group $Z_{II}(1), Z_{II}(3)$ to $Z_{II}(8)$ in position 3 or 4. These all dye paper in grey-blue shades.

EXAMPLE 130

83 Parts of 4-[2',4'-bis(3''-N,N-diethylaminopropylamino)-s-triazine-6'-ylamino]aniline are dissolved in 500 parts water and 100 parts 30% hydrochloric acid and at 0° to 5° C. diazotized with 47 parts of a 4N sodium nitrite solution. After 1 hour the excess nitrite is decomposed with amidosulfonic acid. 25.8 Parts 2- amino-1-methoxy-4-methylbenzene are added thereto and the whole is stirred; the pH is kept at 3.5 by the addition of approximately 100 parts sodium acetate. Coupling is complete after a short time. Stirring is effected for 2 hours. Subsequently, 50 parts 30% hydrochloric acid are added and a further 45 parts of 4N sodium nitrite solution are added dropwise at 15° to 20° C. After diazotization is ended the pH is brought down to 6.5 45 Parts 2-amino-8-hydroxynaphthalene-6-sulfonic acid are then added and the pH is raised to 8–9 with 30% sodium hydroxide solution whereby coupling takes place. A disazoamino compound of formula (a)

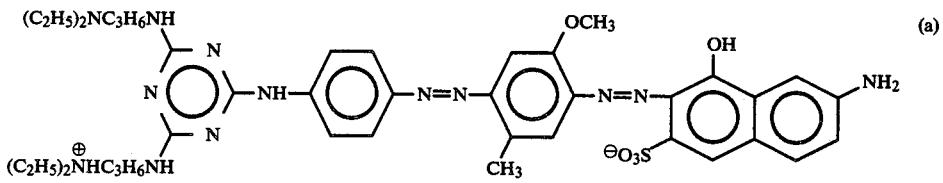

is obtained. As soon as coupling is complete 150 parts sodium chloride are added whereby the dyestuff completely precipitates. It is suction filtered and then stirred in 2000 parts water. Then 100 parts 30% hydrochloric acid are added and 45 parts of a 4N sodium nitrite solution is added dropwise. The excess nitrite is decomposed with amidosulfonic acid. Then 21 parts of 1,3-diaminobenzene (dissolved in water and hydrochloric acid) are poured in and the pH is adjusted to pH 3.5–4 with sodium acetate. Coupling takes place and the dye precipitates out. After the reaction is complete the dye is filtered. The dye of the formula 25% aqueous ammonia). The whole is heated to 95° to 97° C. and is stirred at this temperature for 7 hours. The so-obtained copper complex is filtered hot and a wet presscake is obtained which is stirred in 250 parts water and 15 parts 30% hydrochloric acid. Then 18 parts 1N sodium nitrite solution are added dropwise over a period of 1 hour. After diazotization is completed 2 parts 1,3-diaminobenzene are added and the pH is adjusted to 3.5 to 4 with sodium acetate and the whole is allowed to couple for 3 hours. 100 Parts sodium chloride and then 15 parts 30% sodium hydroxide solution are added to precipitate the dye.

After filtration the dye of the formula

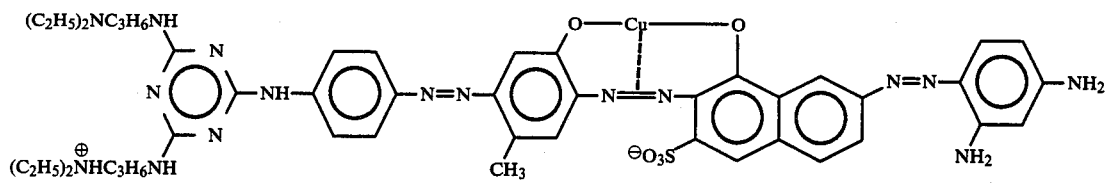

is obtained as a wet presscake; the dyestuff is dried. The dyestuff, in the form of an acid addition salt, dyes paper in greenish black shades. The dyeings have good light- and wet-fastnesses and the waste water is essentially colourless.

EXAMPLE 132

6,8 Parts 4,4'-diamino-3,3'-dimethoxyazobenzene are dissolved in 100 parts water with 12 parts hydrochloric acid and cooled to 0° C. 12 Parts 4N sodium nitrite solution are added dropwise thereto. The tetrazo solu-

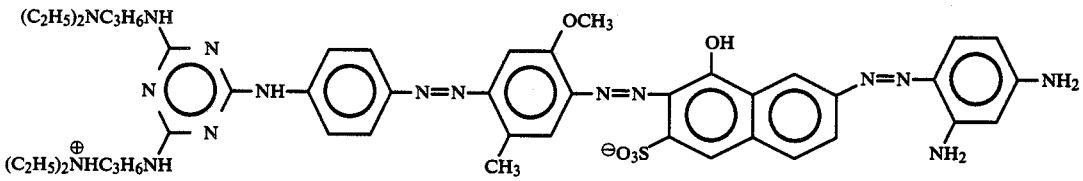

which is obtained in the form of a wet presscake is dried. The dye, in the form of an acid addition salt, dyes paper in neutral black tones. The dyeings dyed on sized and unsized paper show perfect wet-fastnesses and the waste water is colourless.

EXAMPLE 131

17 Parts of the compound (a) of Example 130 are suspended in 200 parts water and reacted with CuSO$_4$.5H$_2$O (dissolved in 50 parts water and 15 parts tion is added dropwise to a soda-alkaline solution containing 28 parts 2-[2',4'-bis(3''-N,N-diethylaminopropylamino-S-triazine-6'-ylamino]-5-hydroxynaphthalene-7-sulfonic acid whereby the pH is held at 8–8.5 by the addition of soda solution. A blue suspension is obtained which is stirred for several hours. Subsequently, 50 parts 30% sodium hydroxide solution are added and the dyestuff precipitates and is filtered and dried. The dyestuff of the formula

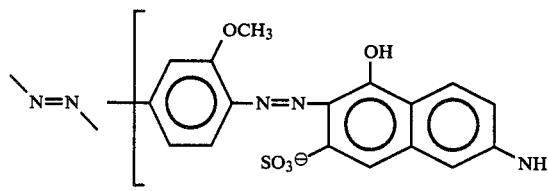

which is obtained in powder form dyes, in acid addition salt form, paper in navy-blue shades. The dyes have good fastnesses.

EXAMPLE 133

When the dyestuff of Example 132 is coppered by demethylation in accordance with the procedure described in Example 2 the corresponding copper complex is obtained, which, in acid addition salt form, dyes paper in blue shades with good fastnesses.

EXAMPLE 134

17 Parts 2-amino-1-methoxy-5-nitrobenzene are suspended in 300 parts water and 25 parts hydrochloric acid are added thereto. Subsequently, it is cooled to 0° C. and 27 parts 4N sodium nitrite solution are added dropwise. Stirring is effected for 3 hours and the yellow solution is filtered clear. This diazo solution is added dropwise to a solution containing 56 parts 2-[2',4'-bis(-3''-N,N-diethylaminopropylamino)-s-triazine-6'-ylamino]-5-hydroxynaphthalene-7-sulfonic acid with the pH being held at 3–3.5 by the portionwise addition of sodium acetate. After 3 hours the diazo solution is no longer detectable. 20 vol. % sodium chloride is added to the orange-red dyestuff solution and the pH is adjusted to c. 11 with sodium hydroxide solution. The precipitated dye is filtered. The wet paste obtained is stirred in 600 parts water. The whole is heated to 60° C. and the pH is adjusted to 7.5–8 with hydrochloric acid upon which everything goes into solution. 30 Parts CuSO$_4$.5-H$_2$O (dissolved in 70 parts water and 50 parts ammonia) are added and the dyestuff suspension is heated to 95° to 98° C. After 2 to 3 hours coppering is complete. 50 Parts sodium hydroxide solution are added and a solution of 15 parts glucose and 50 parts water is added dropwise over 10 minutes. Stirring is effected for 1 hour at 90° C. and the whole is cooled to room temperature. The precipitated dye is filtered and dried. The dye of the formula

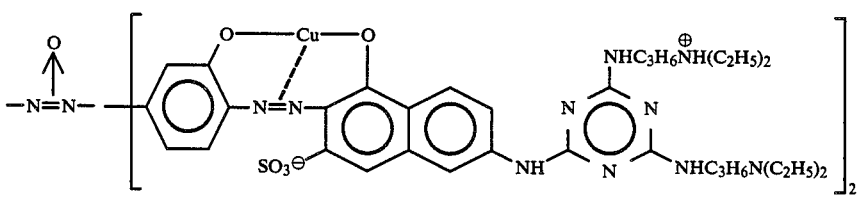

is obtained as a dark powder which, in acid addition salt form, dyes paper in navy-blue shades with good fastnesses.

EXAMPLE 135

Proceeding as described in Example 134 but reducing the dyestuff with glucose in alkaline medium before coppering, the corresponding uncoppered dyestuff is obtained which, in acid addition salt form, dyes paper in violet-blue shades with good wet-fastnesses. By effecting coppering by demethylation the dye can be converted to the copper complex which is identical with Example 134.

In analogy with the procedures described in Examples 132 to 135 further metal-free respectively metallized dyes can be obtained. The dyes are given in Table 6 and correspond in metal-free form to formula

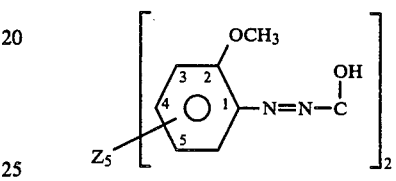

TABLE 6

| Ex. No. | $Z_5$ (position) | C | I |
|---|---|---|---|
| 136 | —N=N— (4) | ![structure] $Z_{II}(2)$, SO$_3^\ominus$ | f |
| 137 | O↑ —N=N— (4) | " | b |
| 138 | corresponding copper complex of Example 136 | | f |
| 139 | corresponding copper complex of Example 137 | | b |
| 140 | —N=N— (4) | $Z_{II}(1)$, SO$_3^\ominus$ | e |
| 141 | corresponding copper complex of Example 140 | | e |
| 142 | O↑ —N=N— (4) | $Z_{II}(2)$, SO$_3^\ominus$ | e |

TABLE 6-continued

| Ex. No. | $Z_5$ (position) | C | I |
|---|---|---|---|
| 143 | corresponding copper complex of Example 142 | | e |
| 144 | —N=N— (4) | [naphthalene with $SO_3^\ominus$, $Z_{II}(2)$] | d |
| 145 | O↑—N=N— (4) | " | d |
| 146 | corresponding copper complex of Example 144 | | d |
| 147 | corresponding copper complex of Example 145 | | d |
| 148 | —N=N— (4) | [naphthalene with $Z_{II}(2)$, $SO_3^\ominus$] | b |
| 149 | O↑—N=N— (4) | [naphthalene with $Z_{II}(2)$, $SO^\ominus$] | j |
| 150 | corresponding copper complex of Example 148 | | b |
| 151 | corresponding copper complex of Example 149 | | j |
| 152 | —N=N— (4) | [naphthalene with $SO_3^\ominus$, $Z_{II}(7)$] | d |
| 153 | " | | d |
| 154 | O↑—N=N— (4) | 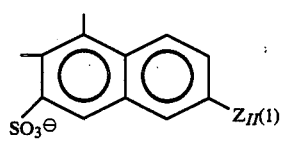 | i |
| 155 | O↑—N=N— (5) | 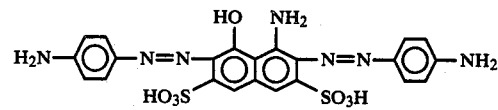 | orange |
| 156 | corresponding copper complex of Example 152 | | d |
| 157 | corresponding copper complex of Example 153 | | d |
| 158 | corresponding copper complex of Example 154 | | i |

In Table 6 the asterisk denotes the C-atom bound to the azo group.

EXAMPLE 159

28 parts of the compound of the formula $$H_2N-\bigcirc-N=N-\underset{HO_3S}{\overset{HO\quad NH_2}{\bigcirc}}-N=N-\bigcirc-NH_2$$

(obtained by diazotiazation of 4-nitroaniline and coupling with 1-amino-8-hydroxynaphthalene-3,6-disulfonic acid followed by reduction with sodium sulfide) are stirred in 900 parts water and reacted with 25 parts 30% hydrochloric acid. 25 Parts 4N sodium nitrite solution are added to this suspension dropwise over 2 hours. Stirring is effected for a further 2 hours and then 1 part amidosulfonic acid is added. 45 Parts 2,4-bis-(3'-N,N-diethylaminopropylamino)-6-(3'-amino-phenylamino)-s-triazine are stirred in 100 parts water and are dissolved with 25 parts 30% hydrochloric acid. 60 Parts sodium acetate are added and subsequently the above tetrazo solution is added dropwise over 2 hours to this preparation. The pH is slowly adjusted to 9 by the addition of 70 parts of 30% sodium hydroxide solution whereupon the dyestuff for the most part precipitates. After filtration the dyestuff of the formula

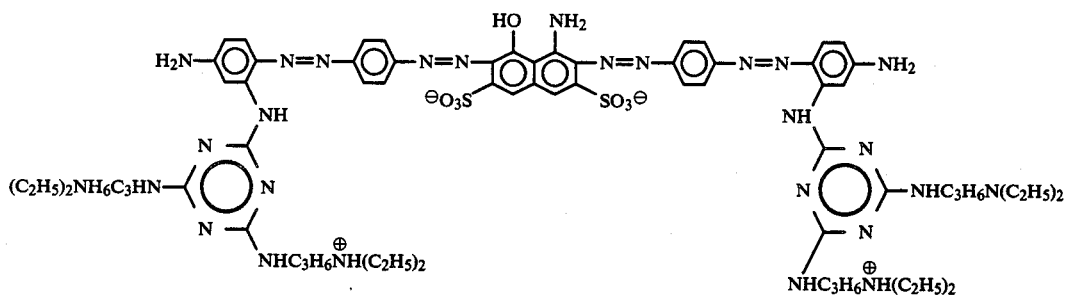

which is obtained as a wet presscake, is dried. The dye, in acid addition salt form, dyes paper in neutral dark black shades and builds-up well on both sized and unsized paper giving dyeings with good wet-fastnesses.

EXAMPLE 160

16 Parts 5-aminobenzene-1,3-dicarboxylic acid-di-(3'-N',N'-dimethylaminopropyl)-amide are stirred into 200 parts water and are dissolved with 30 parts of 30% hydrochloric acid. 100 Parts ice are added and 12 parts 4N sodium nitrite solution are added dropwise. The excess nitrite is decomposed with amidosulfonic acid. 7

Parts of 1-amino-2,5-dimethoxybenzene are added to the weakly yellow diazo solution whereupon a yellow-red dyestuff solution is formed. After 15 minutes the pH is adjusted to 4 by the addition of sodium acetate. Coupling is complete after a further 2 hours. The dye is isolated by the addition of 100 parts 30% sodium hydroxide solution and is subsequently dissolved in 400 parts water and 25 parts 30% hydrochloric acid. 11 Parts 4N sodium nitrite solution are added and stirring is effected for 1 hour. 15 Parts 2-phenylamino-5-hydroxynaphthalene-7-sulfonic acid are stirred in 600 parts water and the pH is adjusted to 9 with 30% sodium hydroxide solution. The above diazo solution is added thereto and the pH is kept at 9 with sodium hydroxide. Coupling is finished after a short time and the dyestuff precipitates. The dye is suction filtered and stirred in 600 parts water. Then 12 parts CuSO$_4$.5H$_2$O (dissolved in 200 parts water and 150 parts 25% aqueous ammonia) are added, the suspension obtained is heated to 97° to 98° C. After 8 hours coppering is complete and the dyestuff which is filtered and is obtained in the form of a wet presscake is of the formula

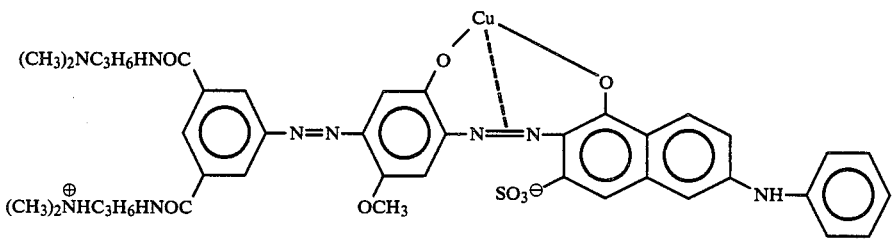

The dye, in acid addition salt form, dyes paper in violet-blue shades with good light- and wet-fastnesses.

EXAMPLE 161

30.2 Parts of the dyestuff powder of Example 80 are stirred in 500 parts water and reacted in 2.4 parts glacial acetic acid. The dye goes completely into solution. Subsequently, the dyestuff solution is evaporated to dryness. The dyestuff which corresponds to the formula

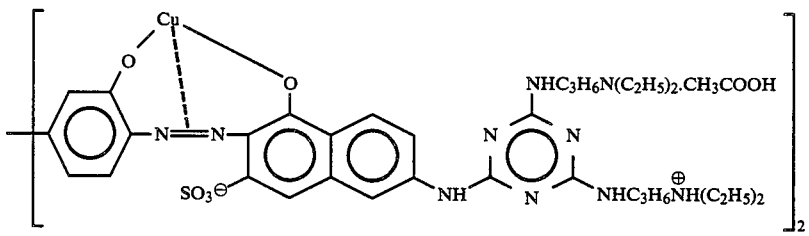

is obtained in powder form and has good solubility in cold water.

Instead of employing the glacial acetic acid of Example 161 hydrochloric acid, sulphuric acid, phosphoric acid, formic acid, lactic acid and other inorganic or preferably organic acids can be used for forming external salts. The dyes of the above Examples may also be converted to acid addition salt form in analogous manner.

EXAMPLE 162

80 Parts of the dyestuff salt of Example 161 are added at room temperature to a solution of 20 parts dextrin, 20 parts glacial acetic acid and 500 parts water and are stirred to a homogeneous suspension. By spray drying blue granulates are obtained which are well soluble in water and dye paper in blue shades. The dyes of the other Examples can also be converted to granulates in analogous manner.

EXAMPLE 163

200 Parts of the dye presscake of Example 80 are stirred in 440 parts water and the pH is adjusted to 5 with 34 parts glacial acetic acid. The so-obtained solution is heated to 80° C. and is filtered clear (employing kieselgur or Hyflo). After cooling 700 parts of a ready-to-use dyestuff solution is obtained, which is storage stable over several months both in cool and warm atmospheres. The dyes of the other Examples can be converted to stable liquid preparations in analogous manner.

APPLICATION EXAMPLE A

70 Parts of chemically bleached sulphite cellulose obtained from pinewood and 30 parts of chemically bleached sulphite cellulose obtained from birchwood are ground in 2000 parts of water in a Hollander. 0.5 Parts of the dyestuff from Example 80 (as an acid addition salt, e.g. according to Example 161) are sprinkled into this pulp. Paper is produced from this pulp after mixing for 20 minutes. The absorbent paper which is obtained in this manner is dyed in a blue shade. The waste water is practically colourless.

APPLICATION EXAMPLE B 0.5 Parts of the dyestuff from Example 80 (as an acid addition salt, e.g. according to Example 161) are dissolved in 100 parts of hot water and cooled to room temperature. This solution is added to 100 parts of chemically bleached sulphite cellulose which have been ground in a Hollander with 200 parts of water. Sizing takes place after thorough mixing for 15 minutes. The paper which is produced from this material has a blue shade and good light- and wet-fastnesses.

APPLICATION EXAMPLE C

An absorbent length of unsized paper is drawn at 40°–50° C. through a dyestuff solution having the following composition:
0.5 parts of the dyestuff from Example 80 (as an acid addition salt, e.g. according to Example 161)
0.5 parts of starch and
99.0 parts of water.

The excess dyestuff solution is squeezed out through two rollers. The dried length of paper is dyed in a blue shade.

The dyestuffs of the remaining Examples may also be used for dyeing according to Application Examples A to C in acid addition salt form or in the form of solid or liquid preparations.

APPLICATION EXAMPLE D

100 Parts freshly tanned and neutralised chrome leather are agitated for 30 minutes in a vessel with a dyebath of 250 parts water at 55° C. and 0.5 parts of the dyestuff of Example 1, 2 or 80, in acid addition salt form, and then treated in the same bath for 30 minutes with 2 parts of an anionic fatty liquor based on sulphonated train oil. The leather is then dried and prepared in the normal way, giving a leather evenly dyed in a grey-violet (grey-blue and blue, respectively) shade.

Other low affinity vegetable-tanned leathers can similarly be dyed by known methods.

APPLICATION EXAMPLE E

2 Parts of the dyestuff of Example 2 in acid addition salt form are dissolved in 4000 parts demineralised water at 40° C. 100 Parts of a pre-wetted cotton textile substrate are added, and the bath is raised to the boiling point over 30 minutes and held at the boil for 1 hour. After rinsing and drying, a greyish-blue dyeing is obtained having good light- and wet-fastnesses. The dye exhausts practically quantitatively, and the waste water is almost colourless.

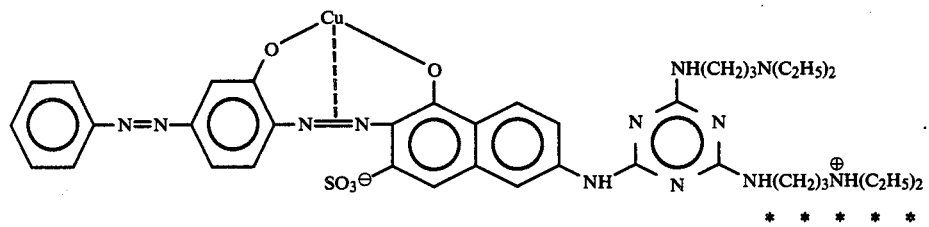

What is claimed is:

1. A metal-free compound or copper complex of the formula

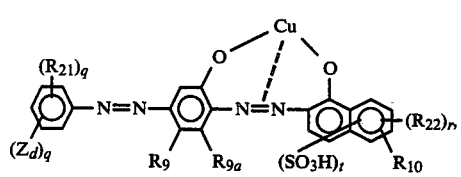 (a)

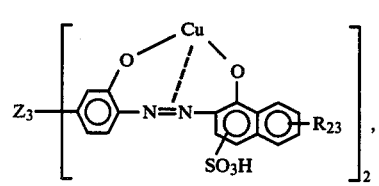 (b)

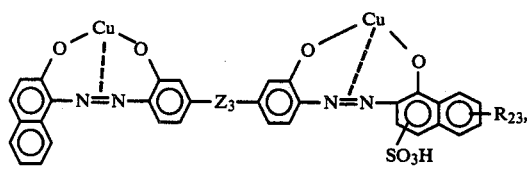 (c)

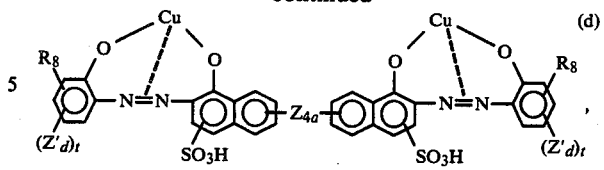 (d)

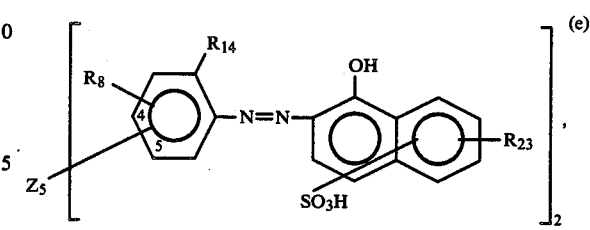 (e)

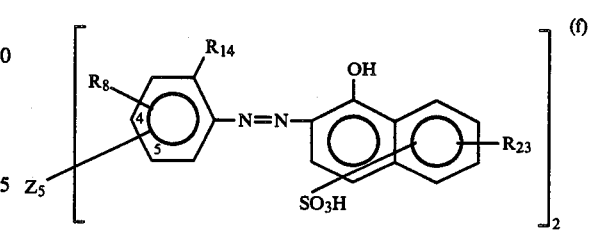 (f)

in 1:1 copper complex form,

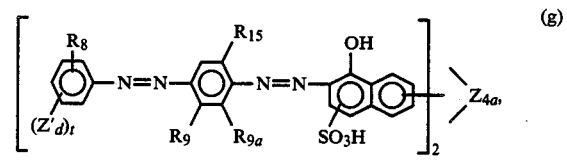 (g)

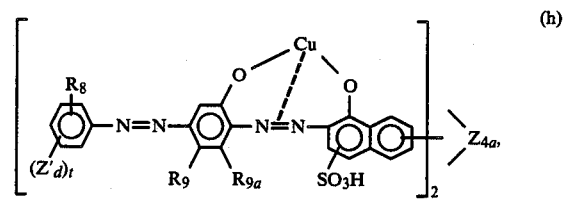 (h)

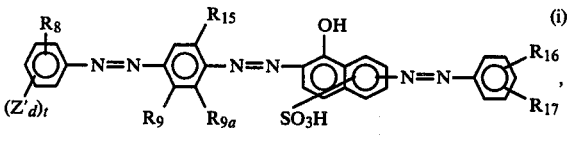 (i)

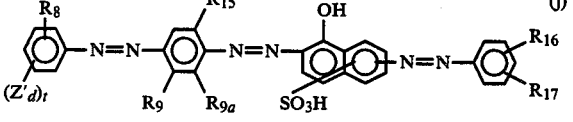 (j)

in 1:1 copper complex form,

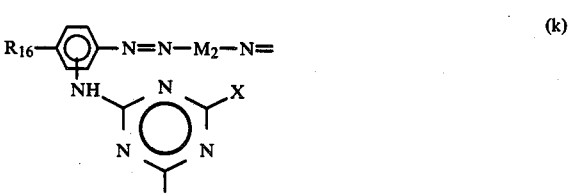 (k)

-continued $$\begin{array}{c} \text{OH} \quad \text{NH}_2 \\ =N-\underset{SO_3H}{\overset{}{\bigcirc\!\!\!\bigcirc}}-N=N-M_2-N=N-\underset{NH}{\overset{}{\bigcirc}}-R_{16} \\ \underset{SO_3H}{\phantom{=N-}}\phantom{\bigcirc\!\!\!\bigcirc} \quad \underset{NH}{\overset{}{\underset{\displaystyle\bigvee}{N}}}\!\!\!\!\!\overset{X}{\underset{X}{\bigvee}}\!\!N \end{array}$$

or $$R_{16}\!\!-\!\!\bigcirc\!\!-\!\!N\!\!=\!\!N\!\!-\!\!M_2\!\!-\!\!N\!\!= \qquad (l)$$
$$\underset{NH}{\phantom{}}\!\!\!\!\!\overset{N}{\underset{X}{\bigvee}}\!\!\!\!\overset{X}{\underset{X}{N}}$$

$$\begin{array}{c} \text{OH} \quad \text{NH}_2 \\ =N-\underset{SO_3H}{\overset{}{\bigcirc\!\!\!\bigcirc}}-N=N-M_2-N=N-\underset{NH}{\overset{}{\bigcirc}}-R_{16} \\ \underset{SO_3H}{\phantom{=N-}}\phantom{\bigcirc\!\!\!\bigcirc} \quad \underset{NH}{\overset{}{\underset{\displaystyle\bigvee}{N}}}\!\!\!\!\!\overset{X}{\underset{X}{\bigvee}}\!\!N \end{array}$$

in 1:1 copper complex form, or an external salt thereof, wherein each $M_2$ is independently

[structures of phenylene with $R_{18}$ substituent]

wherein $R_{18}$ is hydrogen, chloro, methyl or methoxy, each $R_8$ is independently hydrogen, $C_{1-4}$alkyl, $C_{1-4}$alkoxy, fluoro, chloro, bromo, $-SO_2NR_1R_1$ or $-CONR_1R_1$, wherein each $R_1$ is independently hydrogen or $C_{1-4}$alkyl, each $R_9$ is independently hydrogen, fluoro, chloro, bromo, $C_{1-4}$alkyl, $C_{1-4}$alkoxy, ($C_{1-4}$alkyl)carbonylamino, ureido, $-NH-CO-(CH_2)_m-N(C_{1-4}alkyl)_2$ or $-NH-CO-(CH_2)_m-N^{\oplus}(CH_3)_3$, wherein m is 1, 2 or 3, and each $R_{9a}$ is hydrogen or $R_9$ and $R_{9a}$ on the same ring taken together are $-CH=CH-CH=CH-$, $R_{10}$ is hydrogen; hydroxy; amino; ($C_{1-4}$alkyl)-carbonylamino; benzamido; benzamido the phenyl ring of which is substituted by 1 or 2 substituents each of which is selected from fluoro, chloro, bromo, nitro, amino, $C_{1-4}$alkyl and $C_{1-4}$alkoxy; anilino; anilino the phenyl ring of which is substituted by 1 or 2 substituents each of which is selected from fluoro, chloro, bromo, nitro, amino, $C_{1-4}$alkyl and $C_{1-4}$alkoxy; or

[triazine structure with $-NR'_1$, $Y$, $Y'$]

wherein $R_1'$ is hydrogen or methyl,

Y is chloro; hydroxy; $-NR_{20}R_{20}$; $C_{5-6}$cycloalkylamino; anilino; anilino the phenyl ring of which is substituted by 1 or 2 substituents each of which is selected from fluoro, chloro, bromo, $C_{1-4}$alkyl, $C_{1-4}$alkoxy, hydroxy and phenoxy; or morpholino, wherein each $R_{20}$ is independently hydrogen, $C_{1-4}$alkyl or $C_{1-4}$alkyl substituted by fluoro, chloro, bromo, phenyl or hydroxy, and Y' is hydroxy; $-NR_{20}R_{20}$; $C_{5-6}$cycloalkylamino; anilino; anilino the phenyl ring of which is substituted by 1 or 2 substituents each of which is selected from fluoro, chloro, bromo, $C_{1-4}$alkyl, $C_{1-4}$alkoxy, hydroxy and phenoxy; or morpholino, wherein $R_{20}$ is as defined above, each $R_{14}$ is independently hydrogen or methoxy, each $R_{15}$ is independently hydrogen, $C_{1-4}$alkyl or $C_{1-4}$alkoxy, each $R_{16}$ is independently hydroxy or amino, $R_{17}$ is hydroxy, amino or

[triazine structure with $-NH$, $X_b$]

wherein $X_b$ is as defined below, each $R_{21}$ is independently fluoro, chloro, bromo, $C_{1-4}$alkyl, $C_{1-4}$alkoxy, phenoxy, $-NHCO-R_{13}$, $-SO_2R_{13}$, $-SO_2NR_1R_1$ or $-CONR_1R_1$, wherein each $R_1$ is independently hydrogen or $C_{1-4}$alkyl, and $R_{13}$ is $C_{1-4}$alkyl or phenyl, $R_{22}$ is $X_{II}'$ or $$-NR'_1-CO-\bigcirc\!\!\!\!\!-(X'_{II})_r$$

wherein $R_1'$ is hydrogen or methyl, $X_{II}'$ is

[two triazine structures with $-NR_1$, X, Y]

wherein $R_1$ is hydrogen or $C_{1-4}$alkyl,
X is as defined below, and
Y is as defined above, and
r is 0 or 1, each $R_{23}$ is independently $X_{IIz}$ or

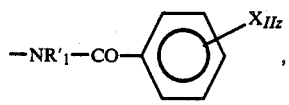

wherein $R_1'$ is hydrogen or methyl, and
$X_{IIz}$ is

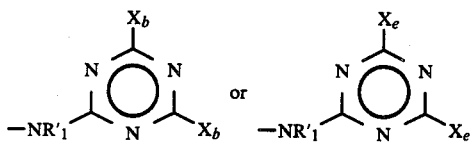

wherein $R_1'$ is hydrogen or methyl, and
$X_b$ and $X_e$ are as defined below,
each X is independently $-NR_2-Q-NR_3R_4$ or $-NR_2-Q-N^{\oplus}R_5R_6R_7$,
wherein Q is linear or branched $C_{2-6}$alkylene or $-NH-CO-CH_2-$,
$R_2$ is hydrogen or $C_{1-4}$alkyl,
each of $R_3$ and $R_4$ is independently hydrogen; $C_{1-6}$alkyl; $C_{2-6}$alkyl monosubstituted by cyano or hydroxy in other than the 1-position; phenyl($C_{1-3}$alkyl); phenyl($C_{1-3}$alkyl) the phenyl ring of which is substituted by 1, 2 or 3 substituents each of which is selected from chloro, $C_{1-4}$alkyl and $C_{1-4}$alkoxy; $C_{5-6}$cycloalkyl or $C_{5-6}$cycloalkyl substituted by 1, 2 or 3 $C_{1-4}$alkyl groups or
$-NR_3R_4$ is pyrrolidino, piperidino or morpholino,
each of $R_5$ and $R_6$ is independently $C_{1-6}$alkyl; $C_{2-6}$alkyl monosubstituted by cyano or hydroxy in other than the 1-position; phenyl($C_{1-3}$alkyl); phenyl($C_{1-3}$alkyl) the phenyl ring of which is substituted by 1, 2 or 3 substituents each of which is selected from chloro, $C_{1-4}$alkyl and $C_{1-4}$alkoxy; $C_{5-6}$cycloalkyl or $C_{5-6}$cycloalkyl substituted by 1, 2 or 3 $C_{1-4}$alkyl groups, and
$R_7$ is $C_{1-4}$alkyl or benzyl or
$-N^{\oplus}R_5R_6R_7$ is $N-R_7$-pyrrolidinium, $N-R_7$-piperidinium, $N-R_7$-morpholinium, pyridinium or pyridinium substituted by 1 or 2 methyl groups, wherein $R_7$ is as defined above,
each $Z_d$ is independently $-CO-X$, $-SO_2-X$ or $X_{II}$,
wherein $X_{II}$ is

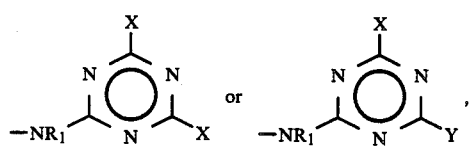

wherein $R_1$ is hydrogen or $C_{1-4}$alkyl, and
X and Y are as defined above, and
X is as defined above, with the proviso that when a $Z_d$ is $X_{II}$, the ring to which it is attached contains only one $Z_d$ group,
each $Z_d'$ is independently $-CO-X_a$, $-SO_2-X_a$, $-CO-X_e$,

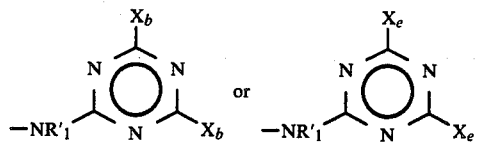

wherein $R_1'$ is hydrogen or methyl,
$X_a$ is $-NR_2'-Q-NR_3'R_4'$,
wherein $R_2'$ is hydrogen or methyl,
each of $R_3'$ and $R_4'$ is independently hydrogen, $C_{1-6}$alkyl, 2-hydroxyethyl, 2- or 3-hydroxy-n-propyl or benzyl or
$-NR_3'R_4'$ is pyrrolidino, piperidino or morpholino, and
Q is as defined above,
each $X_b$ is independently $-NR_2'-Q'-NR_3''R_4''$,
wherein $Q'$ is linear or branched $C_{2-6}$alkylene,
$R_2'$ is hydrogen or methyl, and
each of $R_3''$ and $R_4''$ is independently hydrogen, $C_{1-4}$alkyl or 2-hydroxyethyl or
$-NR_3''R_4''$ is piperidino or morpholino, and
each $X_e$ is independently $-NR_2'-(CH_2)_s-N^{\oplus}(CH_3)_3$ or

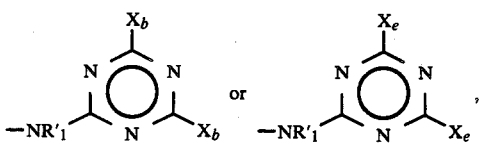

wherein $R_2'$ is hydrogen or methyl, and
s is 2 or 3, with the proviso that when a $Z_d'$ is

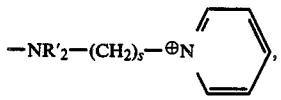

the ring to which it is attached contains only one $Z_d'$ group and otherwise it contains two $Z_d'$ groups,
$Z_3$ is a direct bond, $-(CH_2)_m-$, $-CH=CH-$,

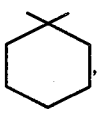

$-P-$, $-NH-$, $-S-$, $-SO_2-$, $-NHCO-$, $-O-(CH_2)_s-O-$, $-NHCONH-$, $-NH-CO-(CH_2)_s-CONH-$ or $-CONH-(CH_2)_s-NHCO-$,
wherein m is 1, 2 or 3, and s is 2 or 3,
$Z_{4a}$ is $-NH-$, $-NHCONH-$, $-NHCOCH_2CH_2CONH-$, $-NHCO-CH=CH-CONH-$,

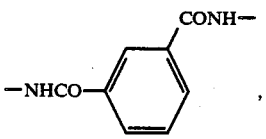

-continued

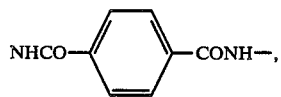

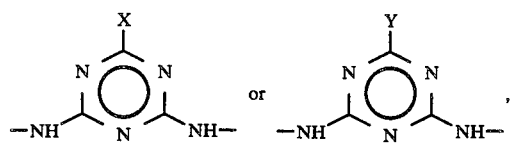

wherein X and Y are as defined above,
$Z_5$ is —N=N— or

with the proviso that each end of $Z_5$ is independently in the 4- or 5-position of the phenyl ring to which it is attached,
each q is independently 0, 1 or 2,
each r is independently 0 or 1, and
each t is independently 1 or 2,
with the provisos that (i) the number of basic and cationic groups together exceeds the number of sulfo groups, (ii) each basic group is independently in free base, internal salt or external acid addition salt form, (iii) the positive charge of each cationic group is independently balanced by the negative charge of a —SO$_3^\ominus$ group of the molecule or by $A^\ominus$, where $A^\ominus$ is an external non-chromophoric anion, and (iv) the number of basic groups in internal salt form and cationic groups the positive charge of which is balanced by the negative charge of a —SO$_3^\ominus$ group of the molecule does not exceed the number of sulfo groups present in the molecule.

2. A copper complex according to claim 1 having the formula

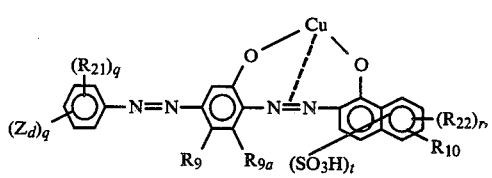

or an external salt thereof.

3. A copper complex according to claim 2 having the formula

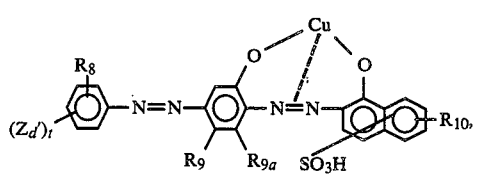

or an external salt thereof.

4. A copper complex according to claim 2 having the formula

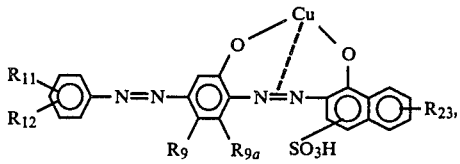

or an external salt thereof,
wherein $R_{11}$ is hydrogen, fluoro, chloro, bromo, $C_{1-4}$alkyl, $C_{1-4}$alkoxy, phenoxy, —NHCO—$R_{13}$, —SO$_2$R$_{13}$, —SO$_2$NR$_1$R$_1$ or —CONR$_1$R$_1$,
wherein each $R_1$ is independently hydrogen or $C_{1-4}$alkyl, and
$R_{13}$ is $C_{1-4}$alkyl or phenyl, and
$R_{12}$ is hydrogen, fluoro, chloro, bromo, $C_{1-4}$alkyl or $C_{1-4}$alkoxy.

5. A copper complex according to claim 2 having the formula

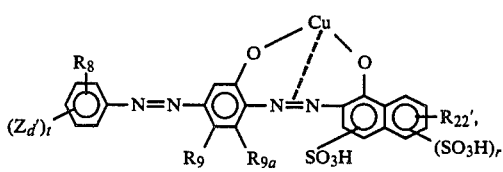

or an external salt thereof, wherein $R_{22}'$ is $X_{II}'$ or

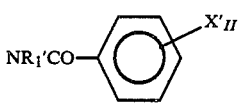

6. A copper complex according to claim 1 having the formula

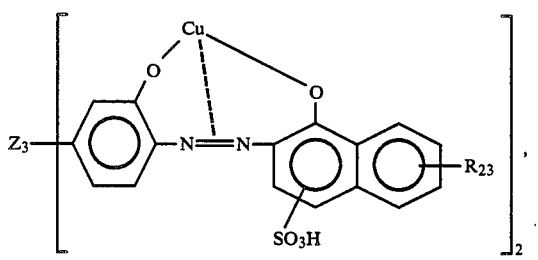

or an external salt thereof.

7. A copper complex according to claim 6, or an external salt thereof, wherein $Z_3$ is a direct bond, —CH$_2$CH$_2$—, —NHCO—, —NHCONH— or —NHCO—CH$_2$CH$_2$—CONH—.

8. A copper complex according to claim 7, or an external salt thereof,
wherein each $R_{23}$ is independently

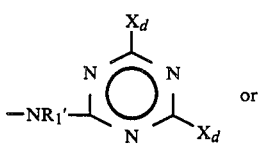

-continued

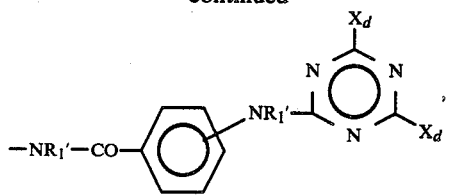

wherein each $R_1'$ is independently hydrogen or methyl, and
each $X_d$ is independently $-NR_2'-(CH_2)_s-NR_3'''R_4'''$,
wherein $R_2'$ is hydrogen or methyl,
each of $R_3'''$ and $R_4'''$ is independently methyl or ethyl, and
s is 2 or 3.

9. A copper complex according to claim 8, or an external salt thereof,
wherein each $R_{23}$ is

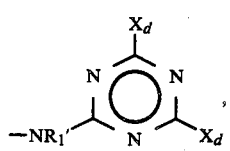

with the proviso that the two $R_{23}$'s are identical.

10. The copper complex according to claim 9 having the formula

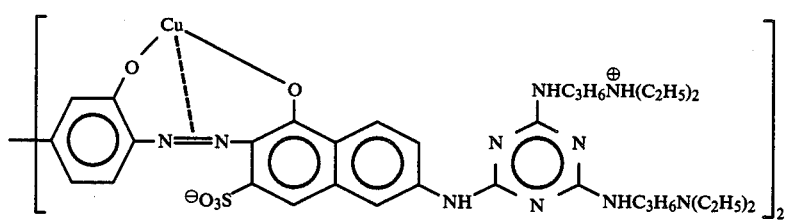

11. A copper complex according to claim 1 having the formula

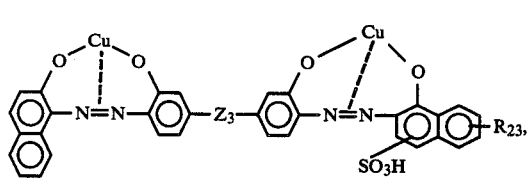

or an external salt thereof.

12. A copper complex according to claim 1 having the formula

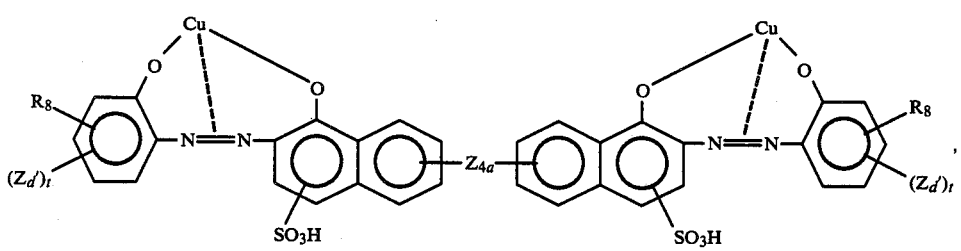

or an external salt thereof.

13. A metal-free compound according to claim 1 having the formula

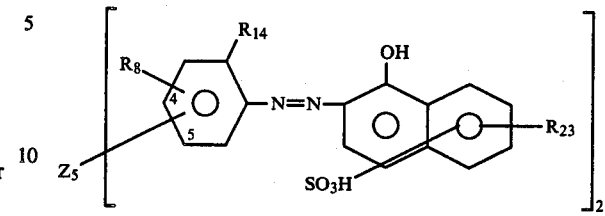

or an external salt thereof.

14. A copper complex according to claim 1, said copper complex being a compound of the formula

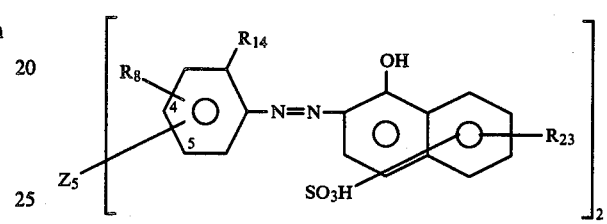

in 1:1 copper complex form, or an external salt thereof.

15. A metal-free compound according to claim 1 having the formula

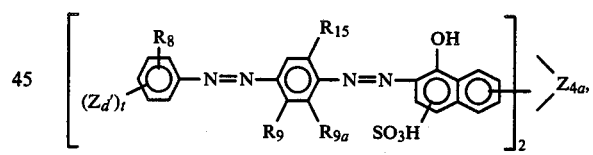

or an external salt thereof.

16. A copper complex according to claim 1 having the formula

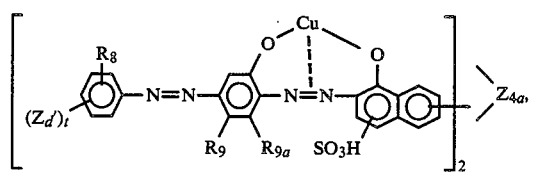

or an external salt thereof.

17. A metal-free compound according to claim 1 having the formula

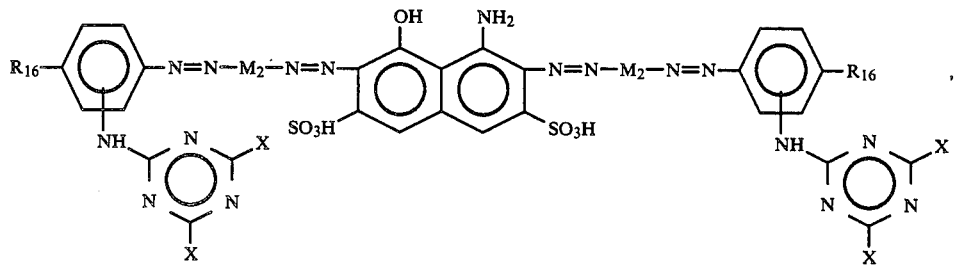

or an external salt thereof.

18. A copper complex according to claim 1, said copper complex being a compound of the formula

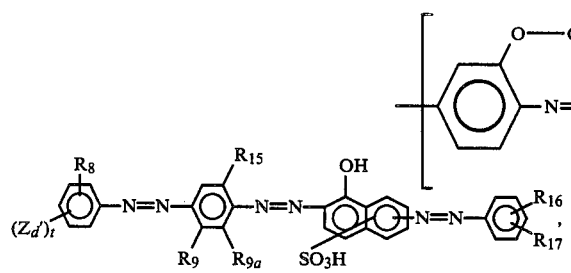

or an external salt thereof.

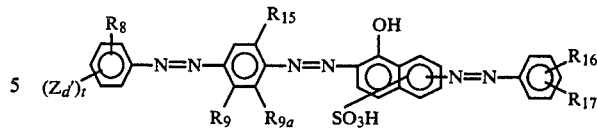

in 1:1 copper complex form, or an external salt thereof.

19. A metal-free compound according to claim 1 having the formula

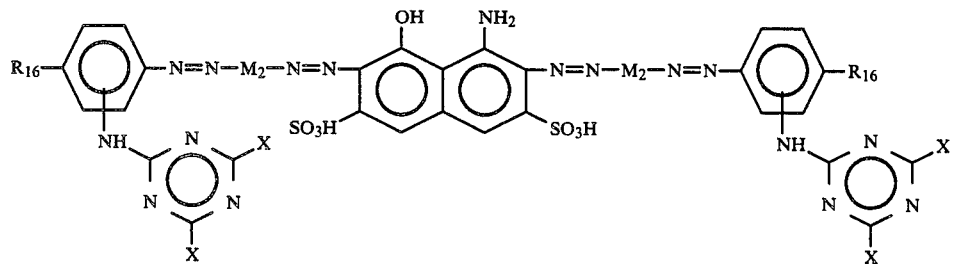

or an external salt thereof.

20. A copper complex according to claim 1, said copper complex being a compound of the formula in 1:1 copper complex form, or an external salt thereof.

21. An acid addition salt of the copper complex according to claim 9 having the formula

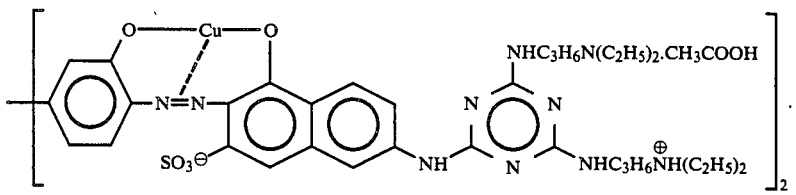

said acid addition salt being an acid addition salt with acetic acid, hydrochloric acid, sulfuric acid, phosphoric acid, formic acid or lactic acid.

22. The acid addition salt according to claim 21 having the formula

23. The copper complex according to claim 4 having the formula